United States Patent
Miyamoto et al.

(10) Patent No.: US 7,978,569 B2
(45) Date of Patent: Jul. 12, 2011

(54) OPTICAL DISC DEVICE AND FOCUS CONTROL METHOD

(75) Inventors: Hirotaka Miyamoto, Kanagawa (JP); Kimihiro Saito, Saitama (JP); Toshihiro Horigome, Kanagawa (JP); Kunihiko Hayashi, Kanagawa (JP)

(73) Assignee: Sony Corporation, Tokyo (JP)

(*) Notice: Subject to any disclaimer, the term of this patent is extended or adjusted under 35 U.S.C. 154(b) by 209 days.

(21) Appl. No.: 12/362,927

(22) Filed: Jan. 30, 2009

(65) Prior Publication Data
US 2009/0245065 A1    Oct. 1, 2009

(30) Foreign Application Priority Data

Mar. 25, 2008 (JP) ................. 2008-078889

(51) Int. Cl.
G11B 7/00 (2006.01)
(52) U.S. Cl. ............. 369/44.27; 369/44.26; 369/44.37
(58) Field of Classification Search .......... 369/94, 369/44.26, 44.27, 44.37
See application file for complete search history.

(56) References Cited

U.S. PATENT DOCUMENTS

| | | | |
|---|---|---|---|
| 2002/0191501 A1* | 12/2002 | Ueno | 369/44.13 |
| 2004/0001400 A1* | 1/2004 | Amble et al. | 369/44.26 |
| 2006/0291360 A1 | 12/2006 | Maeda et al. | |

FOREIGN PATENT DOCUMENTS

| | | |
|---|---|---|
| JP | 4-301226 | 10/1992 |
| JP | 2001-357542 | 12/2001 |
| JP | 2003-338048 | 11/2003 |
| JP | 2007-220206 | 8/2007 |
| JP | 2008-52793 | 3/2008 |
| WO | WO 2007/094456 A1 | 8/2007 |

OTHER PUBLICATIONS

U.S. Appl. No. 12/272,179, filed Nov. 17, 2008, Saito, et al.

* cited by examiner

Primary Examiner — Wayne R Young
Assistant Examiner — Latanya Bibbins
(74) Attorney, Agent, or Firm — Oblon, Spivak, McClelland, Maier & Neustadt, L.L.P.

(57) ABSTRACT

A focus control section first performs a reference focus control process in which a reference optical beam is focused on a reference layer of an optical disc according to the result of receiving a reference reflection optical beam, and then switches from the reference focus control process to an information focus control process in which an information optical beam is focused on a mark layer of the optical disc according to the result of receiving an information reflection optical beam.

8 Claims, 21 Drawing Sheets

OPTICAL DISC DEVICE AND FOCUS CONTROL METHOD

CROSS REFERENCES TO RELATED APPLICATIONS

The present invention contains subject matter related to Japanese Patent Application JP2008-078889 filed in the Japanese Patent Office on Mar. 25, 2008, the entire contents of which being incorporated herein by reference.

BACKGROUND OF THE INVENTION

1. Field of the Invention

The present invention relates to an optical disc device and focus control method, and is preferably applied to for example an optical disc device that reproduces information from an optical disc that has separate layers: a reference layer and a recording layer. The emission position of the optical beam is determined according to the reference layer; the information is recorded on the recording layer.

2. Description of the Related Art

There is an optical disc device that reproduce information by emitting an optical beam toward an optical disc, such as Compact Disc (CD), Digital Versatile Disc (DVD) or "Blu-ray Disc (Registered Trademark: referred to as BD, hereinafter), and detecting the reflection. Such optical disc devices have been popular.

By emitting an optical beam to the optical disc, such an optical disc device actually changes its reflectance locally, thereby recording information.

As for the optical disc, the size of a beam spot formed when the optical beam is converged by components like an objective lens is approximately determined based on $\lambda/NA$ ($\lambda$: the wavelength of the optical beam, NA: numerical aperture). Moreover, its resolution is proportional to that value. For example, the BD-type optical disc with 120 mm in diameter can record about 25 GB of data per layer.

By the way, the optical disc is designed to record various kinds of information, such as various kinds of content (including music and video content) and various kinds of computer data. The amount of information to be recorded has been growing due to high-definition video data or high-quality music data. Moreover, the number of pieces of content to be recorded on one optical disc has been increasing. Therefore, the optical disc is required to have a larger capacity.

To increase the capacity and simplify the structure of the optical disc, some optical disc devices make use of holograms: with a standing-wave recoding technique, they record information evenly on a plurality of recording layers (see Jpn. Pat. Laid-open Publication No. 2007-220206 (FIG. 24)).

SUMMARY OF THE INVENTION

By the way, as for the optical disc that the above optical disc devices support, since its recording layer is flat, the optical disc also contains a reference layer on which tracks or the like are formed for positioning. This allows the device to determine recording positions inside the recording layer.

For example, as shown in FIG. 1, inside a recording layer 101 of an optical disc 100, there are a plurality of layers (referred to as mark layers Y, hereinafter). These layers are a series of recording marks spirally formed to a predetermined plane. Moreover, a predetermined distance DG refers to a distance between a target track TG of the reference layer 102 and a target mark layer YG of the recording layer 101: the direction of the distance DG is parallel to a normal line XD of the reference layer 102.

During a process of reproducing information, the optical disc device 1 lets a predetermined reference beam LS pass through a beam splitter 3. An objective lens 4 focuses the beam on the reference layer 102 of the optical disc 100.

Moreover, after the reference optical beam LS is reflected by the reference layer 102 of the optical disc 100, the optical disc device 1 detects the reflected reference optical beam, and performs such processes as a focus control process and tracking control process of the objective lens 4 according to the result of detection, thereby focusing the reference optical beam LS on a target track TG of the reference layer 102.

Furthermore, the optical disc device 1 lets the beam splitter 3 reflect an information optical beam LM. The objective lens 4, whose position is under control, focuses the beam on a target mark layer YG. The target mark layer YG is among mark layers Y formed inside the recording layer 101.

Based on the assumption that an optical axis XL of the reference optical beam LS and the information optical beam LM is aligned with the normal line XD of the optical disc 100, the optical disc device 1 makes sure that the distance between a focal point FS of the reference optical beam LS and a focal point FM of the information optical beam LM is DG on the optical axis XL. As a result, the focal point FM of the information optical beam LM is positioned on the target mark layer YG.

Incidentally, after the information optical beam LM is reflected by the recording mark of the target mark layer YG, the optical disc device 1 detects the reflection, thereby reproducing information.

There is a possibility that the optical disc 100 inclines with respect to the optical disc device 1 due to the deformation of the optical disc 100, the so-called surface wobbling, or the like.

For example, as shown in FIG. 2 (which shows the same thing as FIG. 1 does), if the optical disc 100 tilts at $\theta$ degrees, the distance between the reference layer 102 and the target mark layer YG in the direction of the optical axis XL becomes $(1/\cos \theta)$ times longer than DG: the distance therefore is not DG.

In this case, even if the reference optical beam LS is being focused on the reference layer 102 of the optical disc 100, the focal point FM of the information optical beam LM is not on the target mark layer YG. Accordingly, the information is not reproduced from the target mark layer YG.

So if the optical disc 100 inclines, this leads to the failure of the focus control process: the optical disc device 1 may not be able to appropriately put the focal point FM of the information optical beam LM on the target mark layer YG. This could result in a dramatic decrease in accuracy of information reproducing.

The present invention has been made in view of the above points and is intended to provide an optical disc device and focus control method that can improve accuracy in reproducing information from an optical disc.

In one aspect of the present invention, an optical disc device comprising: a reference beam source that emits a reference optical beam to an optical disc's reference layer on which concentric or spiral reference tracks are formed; an information beam source that emits an information optical beam in order to reproduce information from a mark layer on which an information track that contains recording marks representing the information is formed such that the information track corresponds to the reference track of the reference layer, wherein the mark layer is positioned inside a recording layer which is a different layer from the reference layer; an objective lens that focuses the reference optical beam and the information optical beam; a beam formation section that shapes the reference optical beam and the information optical beam which enter the objective lens, so that, in terms of a direction of an optical axis of the information optical beam, a distance between the focal points of the reference optical beam and information optical beam focused by the objective lens becomes equal to a distance between the mark layer containing the desired information track and the reference layer; a reference beam reception section that receives a reference reflection optical beam which is the reference optical beam reflected by the reference layer of the optical disc; a information beam reception section that receives an information reflection optical beam which is the information optical beam reflected by the mark layer of the optical disc; a focus control section that performs a focus control process in order to move the objective lens close to or away from the optical disc, wherein the focus control section first performs a reference focus control process in which the reference optical beam is focused on the reference layer according to the result of receiving the reference reflection optical beam, and then switches from the reference focus control process to an information focus control process in which the information optical beam is focused on the mark layer according to the result of receiving the information reflection optical beam.

Even if the optical disc is tilted with respect to the optical disc device, the optical disc device is able to precisely place the focal point of the information optical beam on the desired mark layer by switching from the reference focus control to the information focus control, thereby making it possible to precisely read information from the mark layer.

In another aspect of the present invention, a focus control method comprising: a beam emission step of emitting a reference optical beam to an optical disc's reference layer on which concentric or spiral reference tracks are formed, and an information optical beam to a mark layer on which an information track that contains recording marks representing information is formed such that the information track corresponds to the reference track of the reference layer, wherein the mark layer is positioned inside a recording layer which is a different layer from the reference layer; a reference focus control step of receiving a reference reflection optical beam which is the reference optical beam focused by an objective lens and reflected by the reference layer, and performing, according to the result of receiving the beam, a focus control process in order to move the objective lens close to or away from the optical disc; a beam formation step of shaping the reference optical beam and the information optical beam which enter the objective lens, so that, in terms of a direction of an optical axis of the information optical beam, a distance between the focal points of the reference optical beam and information optical beam focused by the objective lens becomes equal to a distance between the target mark layer containing the target information track and the reference layer; and an information focus control step of receiving an information reflection optical beam which is the information optical beam focused by the objective lens and reflected by the target mark layer, and performing the focus control process according to the result of receiving the beam.

According to the focus control method, even if the optical disc is tilted with respect to the optical disc device, the optical disc device is able to precisely place the focal point of the information optical beam on the desired mark layer by switching from the reference focus control to the information focus control, thereby making it possible to precisely read information from the mark layer.

As described above, even if the optical disc is tilted with respect to the optical disc device, the optical disc device is able to precisely place the focal point of the information optical beam on the desired mark layer by switching from the reference focus control to the information focus control, thereby making it possible to precisely read information from the mark layer. Thus the optical disc device that is able to improve accuracy in reading information from the optical disc can be realized.

Moreover, according to the focus control method, even if the optical disc is tilted with respect to the optical disc device, the optical disc device is able to precisely place the focal point of the information optical beam on the desired mark layer by switching from the reference focus control to the information focus control, thereby making it possible to precisely read information from the mark layer. Thus the focus control method that allows the device to improve accuracy in reading information from the optical disc can be realized.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) First Embodiment (1-1) Basic Concept for Recording and Reproducing Information from Optical Discs The following describes the basic concept of a first embodiment for recording and reproducing information. In the first embodiment, as shown in FIGS. 3 and 4, holograms are recorded on a recording layer 101 of an optical disc 100 as recording marks RM.

Figure 3:
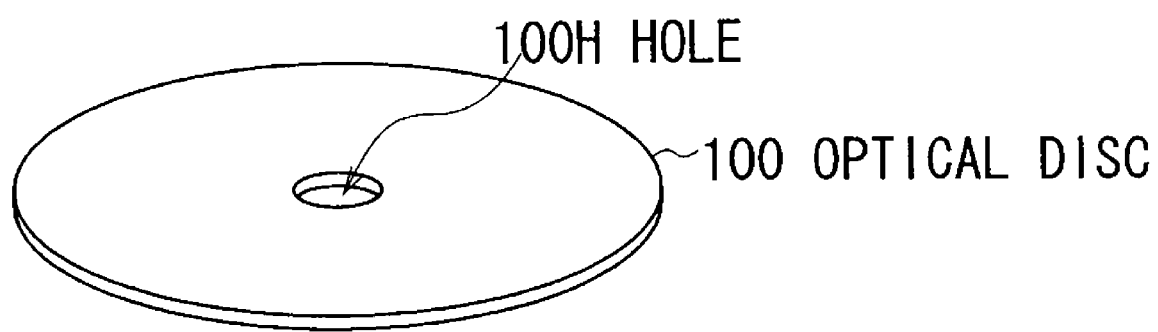
FIG. 3 is a schematic perspective view of an optical disc.

Actually, as shown in FIG. 3, which is an appearance diagram, the optical disc 100, as a whole, is substantially a circular plate; at the center, there is a hole 100H for chucking.

Figure 4:
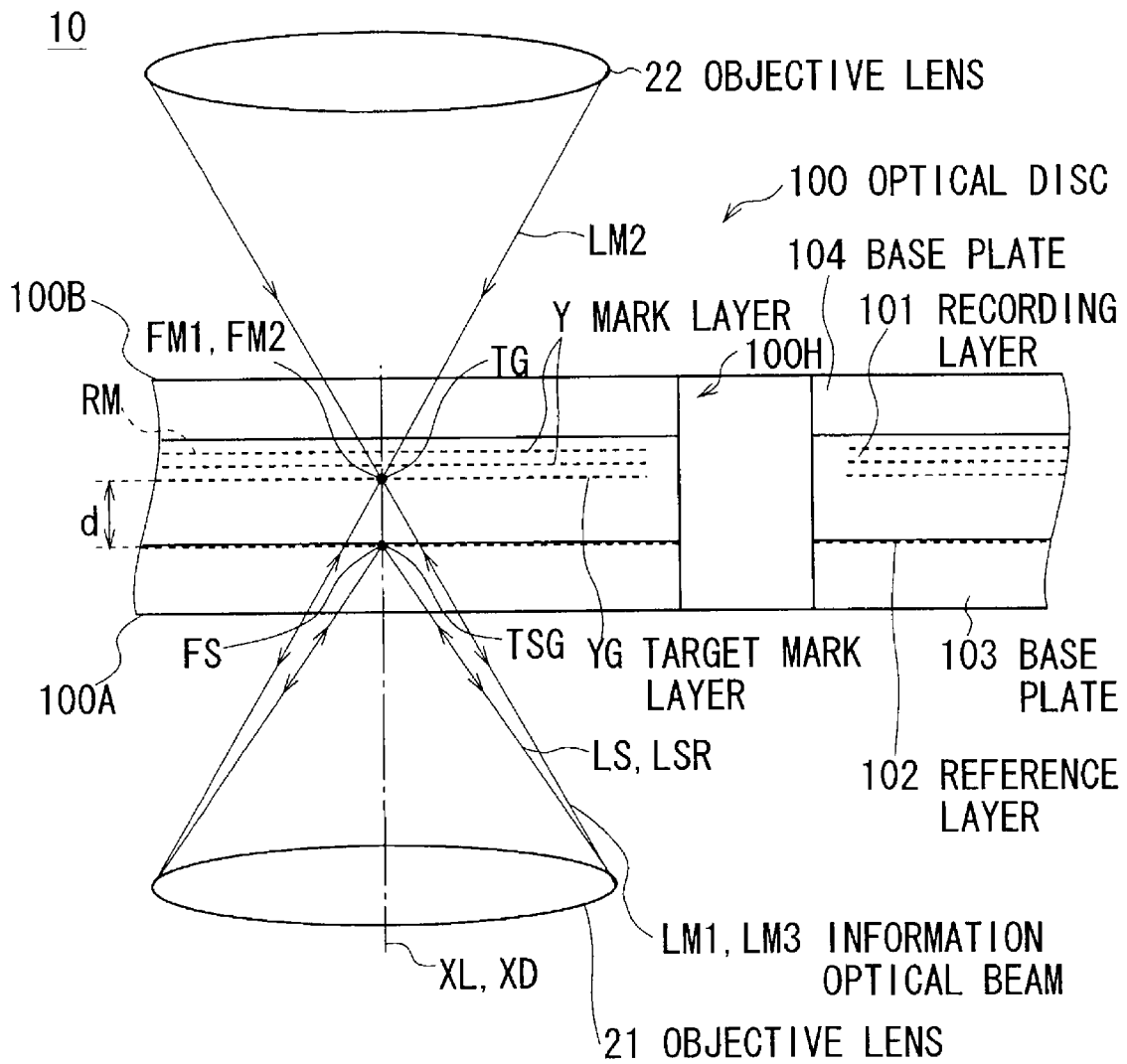
FIG. 4 is a schematic diagram illustrating the focusing of an optical beam according to a first embodiment of the present invention.

Moreover, as shown in FIG. 4, which is a cross-section diagram, the optical disc 100 includes the recording layer 101, and base plates 103 and 104: the recoding layer 101 is sandwiched between the base plates 103 and 104. Moreover, there is a reference layer 102 between the recording layer 101 and the base plate 103. The recording layer 101 is used to record information.

On the reference layer 102, a guide groove is formed for servo. Specifically, a spiral track consisting of lands and grooves is formed: the lands and the grooves are the same as those of typical BD-R (Recordable) discs. Each recording unit of the track is associated with an address: the addresses are a series of numbers. The addresses help identify a track on which information is recorded or from which information is reproduced.

By the way, instead of the guide grooves, pits or a combination of guide grooves, pits and the like may be formed on the reference layer 102 (i.e. on a boundary between the recording layer 101 and the base plate 103). Moreover, the track of the reference layer 102 may be formed concentrically, not spirally.

Moreover, the reference layer 102 is equipped with wavelength selectivity: the reflectance varies according to the wavelength of the optical beam. The reference layer 102 allows the optical beam with wavelength of about 405 nm to pass therethrough at high transmittance, while reflecting the optical beam with wavelength of about 660 nm at high reflectance.

An optical disc device 10 emits to the optical disc 100 a servo optical beam LS with wavelength of about 660 nm. The servo optical beam LS is reflected by the reference layer 102 of the optical disc 100, becoming a servo reflection optical beam LSR.

The optical disc device 10 receives the servo reflection optical beam LSR. Based on the result of receiving the servo reflection optical beam LSR, the optical disc device 10 controls the position of the objective lens 21 such that the objective lens 21 moves close to or away from the optical disc 100 (i.e. in the focus direction), thereby putting a focal point FS of the servo optical beam LS on a target reference track TSG of the reference layer 102.

On the other hand, the recording layer 101 is made from photopolymer or the like: the refraction index of the recording layer 101 changes according to the intensity of the emitted optical beam. The recording layer 101 reacts with a blue optical beam with wavelength of 405 nm.

When recording information on the optical disc 100, the optical disc device 10 emits an information optical beam LM1 toward a first surface 100A via an objective lens 21 and focuses the information optical beam LM1 on the optical disc 100. At the same time, the optical disc device 10 emits an information optical beam LM2 toward a second surface 100B via an objective lens 22 and focuses the information optical beam LM2 on the same focal point FM. The information optical beams LM1 and LM2 are laser beams emitted from the same light source, causing excessive interference.

At this time, the optical disc device 10 aligns an optical axis of the servo optical beam LS with an optical axis of the information optical beam LM1. Therefore, the optical disc device 10 places the focal point FM1 of the information optical beam LM1 at a position corresponding to the target reference track TSG inside the recording layer 101, i.e. the focal point FM1 is positioned on a normal line XD which passes through the target reference track TSG and is perpendicular to the reference layer 102. Hereinafter, a track which is on a target mark layer YG and corresponds to the target reference track TSG is referred to as target track TG; the position of the focal point FM1 is referred to as target position PG.

Inside the recording layer 101, standing waves occur where the relatively high-intensity information optical beams LM1 and LM2 interfere with each other, thereby creating a interference patter which has the characteristics of holograms.

As a result, a hologram, or a recording mark RM, is formed at the focal point FM1 inside the recording layer 101 of the optical disc 100.

Incidentally, the optical disc device 10 encodes data (which are to be recorded) into binary recording data consisting of two symbols: 0 and 1. For example, by controlling the emission of the information optical beam LM, the optical disc device 10 produces the recording mark RM for the symbol "1," whereas the optical disc device 10 does not produce the recording mark RM for the symbol "0."

Moreover, the optical disc device 10, when needed, rotates the optical disc 100 and moves the objective lenses 21 and 22 in the radial direction, while adjusting the intensity of the information optical beams LM1 and LM2.

As a result, inside the recording layer 101 of the optical disc 100, a spiral track consists of a series of recording marks RM is sequentially formed as if it corresponds to the track formed on the reference layer 102.

The series of recording marks RM is arranged on a plane parallel to each surface, such as the first surface 100A of the optical disc 100 or the reference layer 102, thereby forming a layer (referred to as mark layer Y, hereinafter) consisting of the recording marks RM.

Moreover, the optical disc device 10 adjusts the position of the focal point FM1 of the information optical beam LM1 in the direction of the thickness of the optical disc 100, thereby forming a plurality of mark layers Y inside the recording layer 101. The optical disc device 10 sequentially forms the mark layers Y from the first surface 100A of the optical disc 100 toward the second surface 100B: the mark layers Y are evenly spaced a predetermined distance.

When reproducing information from the optical disc 100, the optical disc device 10 for example emits the information optical beam LM1 toward the first surface 100A and focuses the information optical beam LM1 on the optical disc 100. If there is the recording mark RM (hologram) at the position of the focal point FM1 (i.e. the target position PG), an information optical beam LM3 emerges from the recording mark RM.

The information optical beam LM3 is the diffracted information optical beam LM1, which was caused by the characteristics of the hologram, or the recording mark RM. The optical characteristics of the information optical beam LM3 is substantially the same as the optical characteristics of the information optical beam LM2, which passes through the recording mark RM and travels ahead.

The optical disc device 10 generates a detection signal according to whether the optical disc device 10 has detected the information optical beam LM3, and makes a determination as to whether or not there is a recording mark RM.

If there is a recording mark RM, the optical disc device 10 allocates a symbol of "1"; if there is no recording mark RM, the optical disc device 10 allocates a symbol of "0." In this manner, the optical disc device 10 reproduces information from the optical disc 100.

As described above, in the first embodiment, when reproducing information from the optical disc 100, the optical disc device 10 uses both the servo optical beam LS and the information optical beam LM1: the optical disc device 10 emits the information optical beam LM1 to the target position PG, thereby reproducing desired information.

(1-2) Configuration of Optical Disc Device

Figure 5:
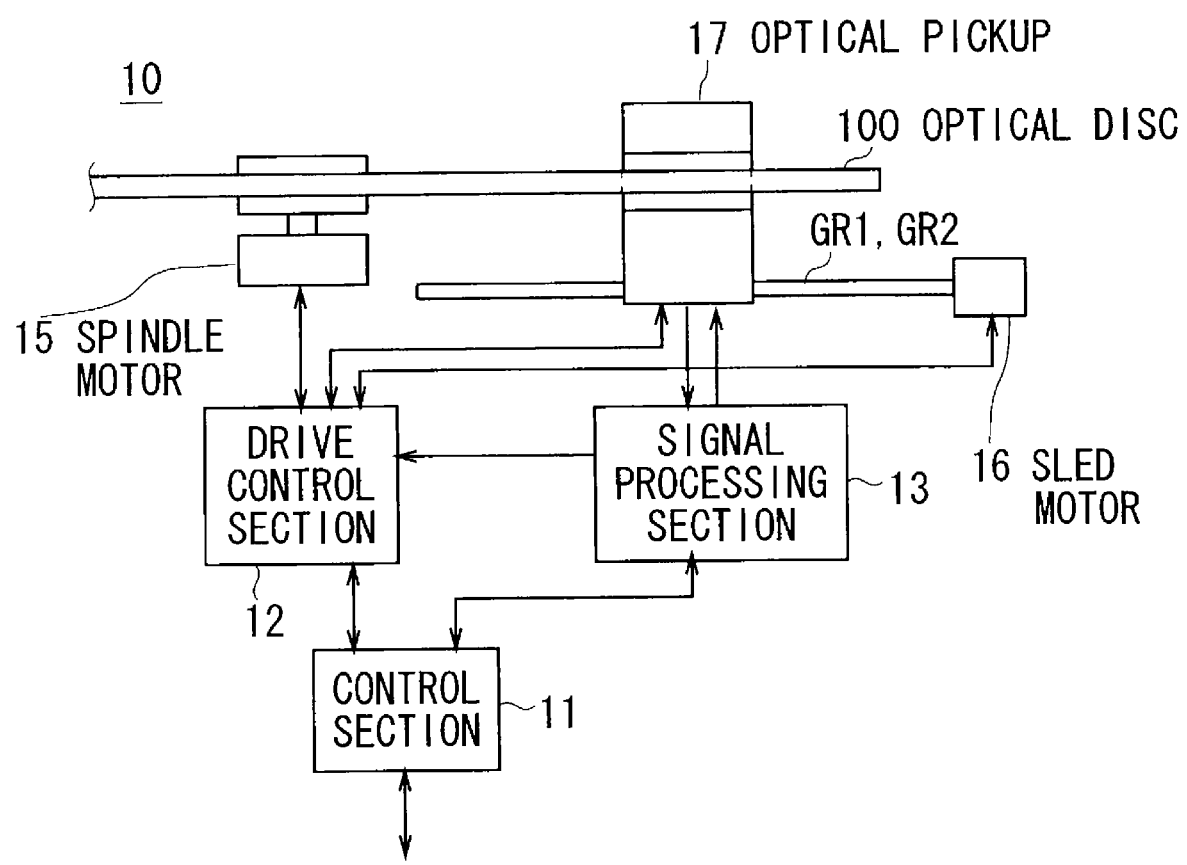
FIG. 5 is a schematic diagram illustrating the configuration of an optical disc device according to the first embodiment.

As shown in FIG. 5, the optical disc device 10 is configured with a control section 11 as a main component: the control section 11 includes Central Processing Unit (CPU), Read Only Memory (ROM) storing various programs, and Random Access Memory (RAM) serving as a work memory for CPU (these components are not shown).

When reproducing information from the optical disc 100, the control section 11 controls a drive control section 12 to drive a spindle motor 15, thereby rotating an optical disc 100 placed on a predetermined turntable at a desired speed.

Moreover, the control section 11 controls the drive control section 12 to drive a sled motor 16, thereby moving an optical pickup 17 along motion shafts GR1 and GR2. Therefore, the optical pickup 17 moves in a tracking direction, or toward the innermost or outermost part of the optical disc 100.

The optical pickup 17 is equipped with a plurality of optical components including the objective lens 21. Under the control of the control section 11, the optical pickup 17 emits the servo optical beam LS and the information optical beam LM1 to the optical disc 100, and then detects the servo reflection optical beam LSR and the information optical beam LM3.

Based on the result of detecting the servo reflection optical beam LSR and the information optical beam LM3, the optical pickup 17 generates a plurality of detection signals, and supplies them to a signal processing section 13. The signal processing section 13 performs a predetermined arithmetic process using the supplied detection signals to produce a focus error signal and a tracking error signal, and then supplies the focus error signal and the tracking error signal to the drive control section 12.

Based on the supplied focus error signal and tracking error signal, the drive control section 12 generates a drive signal for driving the objective lens 21, and supplies it to a two-axis actuator 23 of the optical pickup 17.

Based on the drive signal, the two-axis actuator 23 of the optical pickup 17 performs a focus control process and tracking control process of the objective lens 21 to adjust the position of the focal point FS of the servo optical beam LS and the position of the focal point FM1 of the information optical beam LM1 (described in detail later): these beams LS and LM1 are focused by the objective lens 21.

Moreover, the signal processing section 13 performs processes, such as predetermined arithmetic process, modulation process and decoding process, for the detection signals. In this manner, the signal processing section 13 reproduces information from the recording marks RM on the target track TG of the target mark layer YG.

(1-3) Configuration of Optical Pickup

Figure 6:
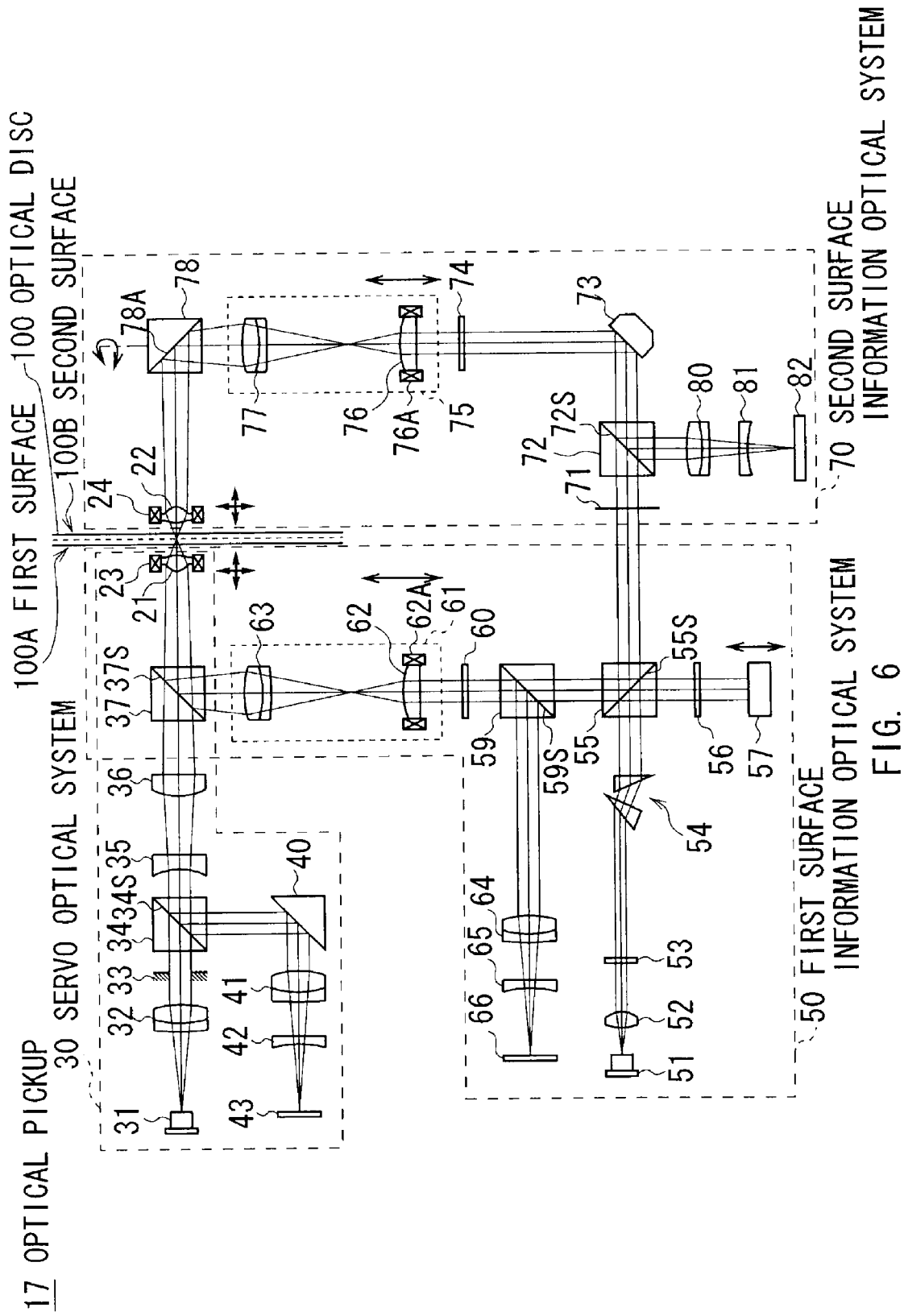
FIG. 6 is a schematic diagram illustrating the configuration of an optical pickup according to the first embodiment.

The following describes the configuration of the optical pickup 17. As shown in FIG. 6, the optical pickup 17 is a combination of many optical components, and generally includes three systems: a servo optical system 30 for servo control of the objective lens 21, and first and second surface information optical systems 50 and 70 for reproduction and recording of information.

(1-3-1) Configuration of Servo Optical System

The servo optical system 30 is designed to emit the servo optical beam LS to the first surface 100A of the optical disc 100 and receive the servo reflection optical beam LSR, which is the servo optical beam LS reflected by the optical disc 100.

Figure 7:
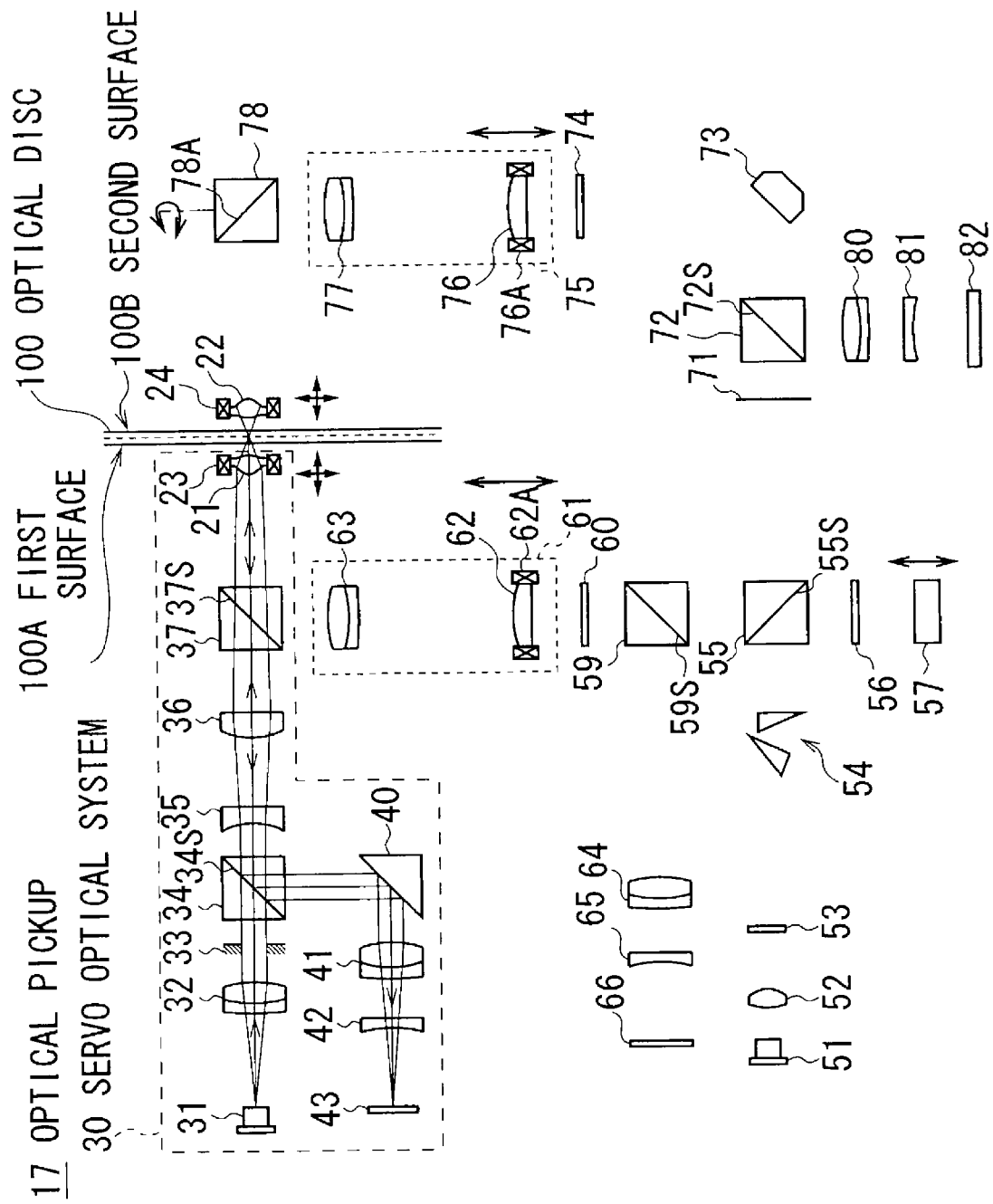
FIG. 7 is a schematic diagram illustrating an optical path of an optical beam according to the first embodiment.

As shown in FIG. 7, a laser diode 31 of the servo optical system 30 emits a red laser beam with wavelength of around 660 nm. Actually, the laser diode 31, under the control of the control section 11 (FIG. 5), emits a diverging beam, or the servo optical beam LS, into a collimator lens 32. After collimating the servo optical beam LS, the collimator lens 32 lets it enter a non-polarization beam splitter 34 via a slit 33.

The non-polarization beam splitter 34 allows about 50 percent of the servo optical beam LS to pass through a reflection and transmission plane 34S, and then lets it enter a correction lens 35. In cooperation with a correction lens 36, the correction lens 35 causes the servo optical beam LS to diverge and then causes it to converge to adjust the beam diameter of the servo optical beam LS; the correction lens 35 then lets it enter a dichroic prism 37.

With wavelength selectivity, the transmittance and reflectance of a reflection and transmission plane 37S of the dichroic prism 37 varies according to the wavelength of the optical beam: the reflection and transmission plane 37S allows almost 100 percent of the red optical beam to pass therethrough, while reflecting almost 100 percent of a blue optical beam. Therefore, the reflection and transmission plane 37S of the dichroic prism 37 allows the servo optical beam LS to pass therethrough, letting it enter the objective lens 21.

The objective lens 21 causes the servo optical beam LS to converge, and leads it to the first surface 100A of the optical disc 100. At this time, as shown in FIG. 4, the servo optical beam LS passes through the base plate 103 and is reflected by the reference layer 102, becoming the servo reflection optical beam LSR traveling in the opposite direction to the servo optical beam LS.

After that, while passing through the objective lens 21, the dichroic prism 37 and the correction lenses 36 and 35, the servo reflection optical beam LSR is collimated and then enters the non-polarization beam splitter 34.

The non-polarization beam splitter 34 reflects around 50 percent of the servo reflection optical beam LSR and leads it to a mirror 40. The mirror 40 reflects the servo reflection optical beam LSR toward a condenser lens 41.

The condenser lens 41 causes the servo reflection optical beam LSR to converge. Then a cylindrical lens 42 causes the servo reflection optical beam LSR to have astigmatism before the servo reflection optical beam LSR reaches a photodetector 43.

Incidentally, the location of each optical component of the servo optical system 30 is optically adjusted so that the state of the servo optical beam LS focused on the reference layer 102 of the optical disc 100 by the objective lens 21 becomes associated with the state of the servo reflection optical beam LSR focused on the photodetector 43 by the condenser lens 41.

Figure 8A:
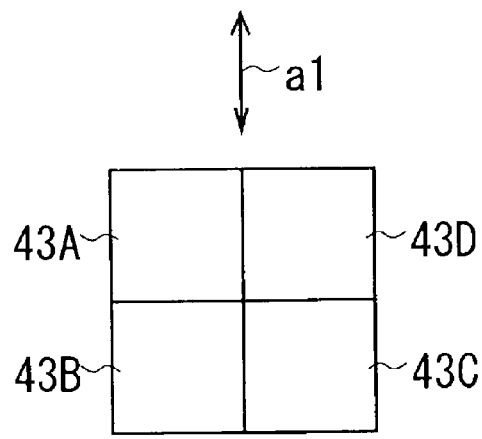
FIGS. 8A to 8C are schematic diagrams illustrating the configuration of detection areas of a photodetector.

As shown in FIG. 8A, the photodetector 43 has a surface that receives the servo reflection beam LSR. This surface is divided in grid-like fashion into four detection areas 43A, 43B, 43C and 43D. Incidentally, an arrow a1 indicates a direction (the vertical direction in the diagram) along which a track runs when the servo optical beam LS is emitted to the reference layer 102 (FIG. 4).

Each of the detection areas 43A, 43B, 43C and 43D of the photodetector 43 detects part of the servo reflection optical beam LSR. Based on the detected intensity of the beam, they generate detection signals U1A, U1B, U1C and U1D (these signals are also collectively referred to as servo detection signal U1, hereinafter), and transmit them to the signal processing section 13 (FIG. 5).

In that manner, the servo optical system 30 emits the servo optical beam LS to the reference layer 102 of the optical disc 100, detects the servo reflection optical beam LSR to generate the servo detection signal U1 (i.e. the detection signals U1A, U1B, U1C and U1D), and supplies them to the signal processing section 13.

(1-3-2) Configuration of First Surface Information Optical System

The first surface information optical system 50 is designed to emit the information optical beam LM1 to the first surface 100A of the optical disc 100 and receive the information optical beam LM3 from the optical disc 100.

Figure 9:
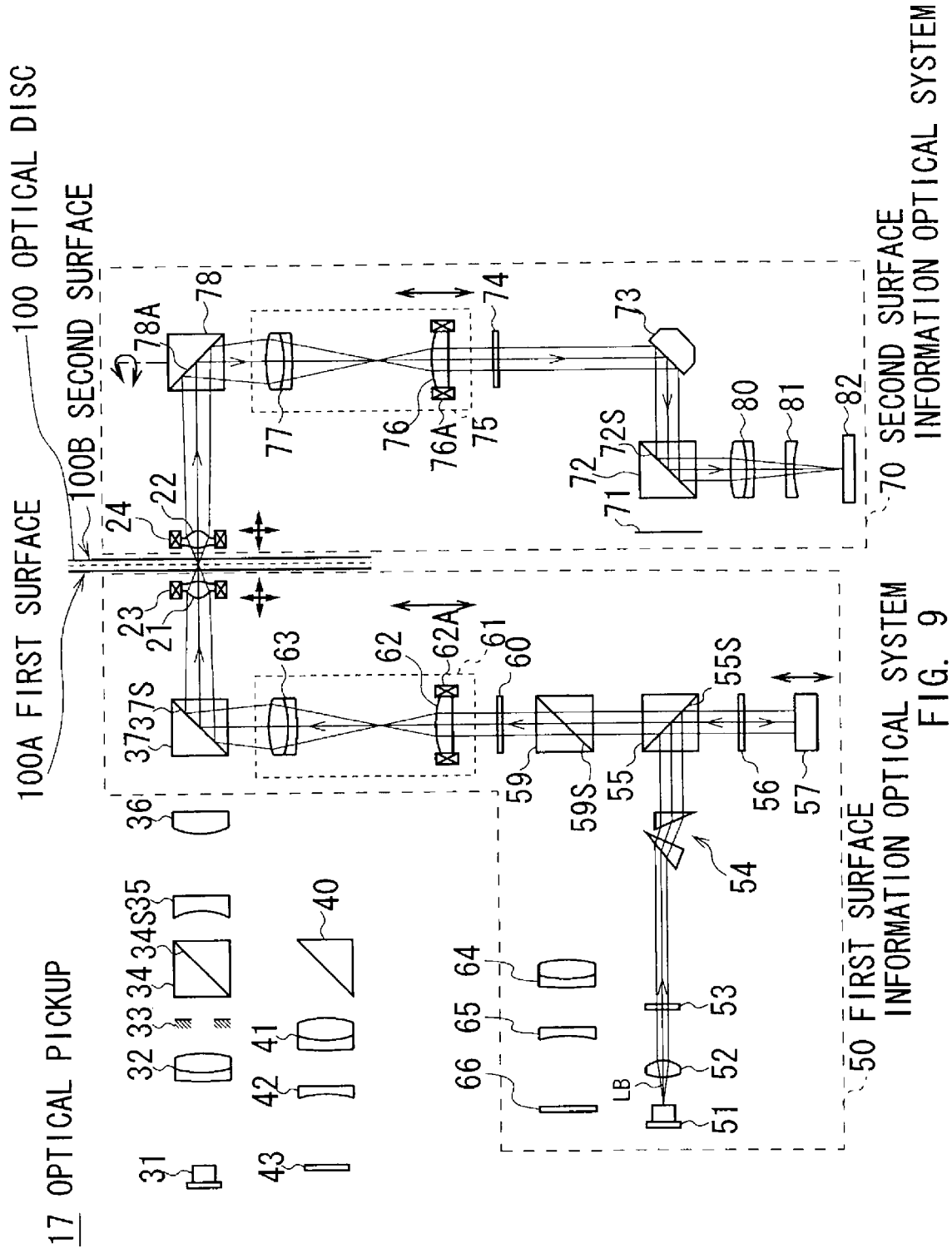
FIG. 9 is a schematic diagram illustrating an optical path of an optical beam according to the first embodiment.

With reference to FIG. 9, a laser diode 51 of the first surface information optical system 50 emits a blue laser beam with wavelength of about 405 nm. Actually, the laser diode 51, under the control of the control section 11 (FIG. 5), emits a predetermined intensity of a diverging optical beam LM0 to a collimator lens 52.

The collimator lens 52 collimates the optical beam LM0 and lets it enter a half-wave plate 53. At this time, the polarization direction of a blue optical beam LB is rotated through a predetermined angle by the half-wave plate 53, and after its intensity distribution is shaped by an anamorphic prism 54, the blue optical beam LB enters a polarization beam splitter 55.

A reflection and transmission plane 55S of the polarization beam splitter 55 reflects part of the optical beam while reflecting the rest of it: the ratio of reflection to transmission varies according to the polarization direction of the optical beam. For example, the reflection and transmission plane 55S allows about 50 percent of the p-polarized optical beam to pass therethrough while reflecting the remaining 50 percent of it; the reflection and transmission plane 55S reflects about 100 percent of the s-polarized optical beam.

Actually, the reflection and transmission plane 55S of the polarization beam splitter 55 reflects about 50 percent of the p-polarized optical beam LM0, and lets it enter a quarter-wave plate 56; the reflection and transmission plane 55S allows the remaining 50 percent to pass therethrough, and lets it enter a shutter 71. Hereinafter, the optical beam reflected by the reflection and transmission plane 55S is referred to as the information optical beam LM1; the optical beam passing through the reflection and transmission plane 55S is referred to as the information optical beam LM2.

The quarter-wave plate 56 converts the linearly polarized information optical beam LM1 into the circularly polarized information optical beam LM1, and leads it to a movable mirror 57. Moreover, the quarter-wave plate 56 converts the circularly polarized information optical beam LM1, reflected by the movable mirror 57, into the linearly polarized information optical beam LM1, and lets it enter the polarization beam splitter 55 again.

At this time, for example, the information optical beam LM1 is converted by the quarter-wave plate 56 from the p-polarized to the left-handed circularly polarized; when reflected by the movable mirror 57, it is converted from the left-handed circularly polarized to the right-handed circularly polarized. After that, it is converted by the quarter-wave plate 56 from the right-handed circularly polarized to the s-polarized.

In this case, the optical pickup 17 causes the information optical beam LM1 to move back and forth between the polarization beam splitter 55 and the movable mirror 57 so that the difference in optical path length between the information optical beam LM1 and the information optical beam LM2 is less than coherence length. Incidentally, the position of the movable lens 57 is adjusted by the control section 11.

In response to the polarization direction of the (s-polarized) information optical beam LM1 from the quarter-wave plate 56, the polarization beam splitter 55 allows the information optical beam LM1 to pass through the reflection and transmission plane 55S (which does not reflect it), and lets it enter a polarization beam splitter 59.

A reflection and transmission plane 59S of the polarization beam splitter 59, for example, is designed to reflect about 100 percent of the p-polarized optical beam, while allowing almost 100 percent of the s-polarized optical beam to pass therethrough. Actually, the reflection and transmission plane 59S of the polarization beam splitter 59 allows almost 100 percent of the information optical beam LM1 to pass therethrough. Then, the information optical beam LM1 is converted by a quarter-wave plate 60 from the linearly polarized (s-polarized) to the circularly polarized (right-handed circularly polarized) before entering a relay lens 61.

The relay lens 61 uses a movable lens 62 to convert the collimated information optical beam LM1 into the converging information optical beam LM1. After that, it is converted into the diverging information optical beam LM1, and enters a fixed lens 63. The fixed lens 63 converts the diverging information optical beam LM1 into the converging information optical beam LM1, and lets it enter the dichroic prism 37.

Here, the movable lens 62 is driven by an actuator 62A to move in the same direction as the optical axis of the information optical beam LM1. Actually, in the relay lens 61, under the control of the control section 11 (FIG. 5), the actuator 62A drives the movable lens 62 in order to change the convergence state of the information optical beam LM1 coming from the fixed lens 63.

The reflection and transmission plane 37S of the dichroic prism 37 reflects the information optical beam LM1 according to the wavelength of the information optical beam LM1, and lets it enter the objective lens 21. The objective lens 21 causes the information optical beam LM1 to converge, and leads it to the first surface 100A of the optical disc 100.

Here, the distance between the focal point FM1 of the information optical beam LM1 and the focal point FS of the servo optical beam LS, related to the focus direction, is determined based on the divergence angle of the information optical beam LM1 coming out of the relay lens 61.

Actually, in the relay lens 61, the position of the movable lens 62 is adjusted so that the distance between the focal points FM1 and FS related to the focus direction becomes equal to the distance d between the reference layer 102 and the target mark layer YG (FIG. 4). Moreover, a focus control process of the objective lens 21 is performed so that the servo optical beam LS is focused on the reference layer 102 (described in detail later).

Accordingly, as shown in FIG. 4, the information optical beam LM1 is focused by the objective lens 21 on the target mark layer YG inside the recording layer 101.

Figure 10:
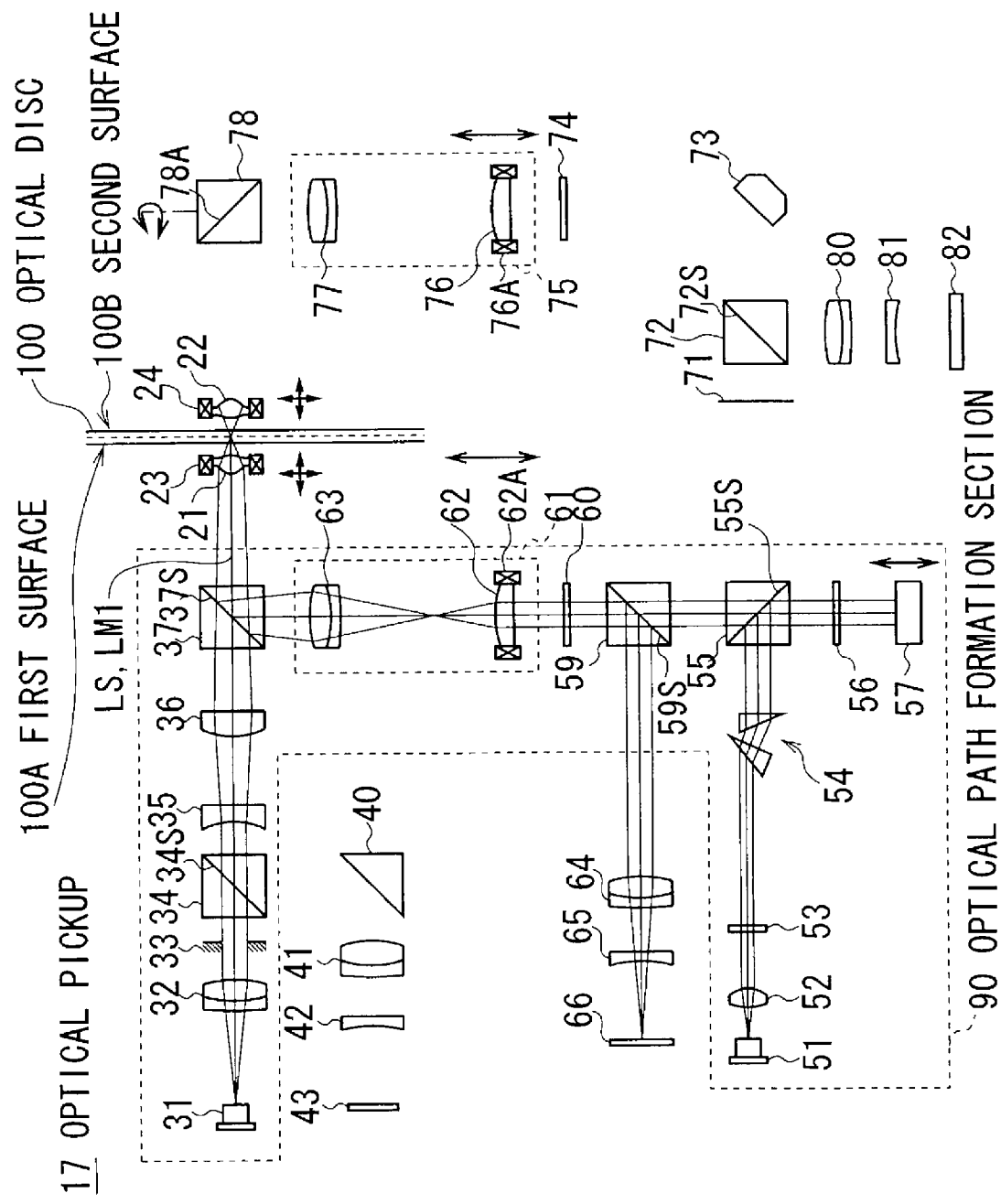
FIG. 10 is a schematic diagram illustrating the configuration of an optical path formation section according to the first embodiment.

That means that as shown in FIG. 10, in the servo optical system 30 and the first surface information optical system 50, an optical path formation section 90 that includes the laser diodes 31 and 51, the collimator lenses 32 and 52 and relay lens 61 is able to appropriately shape the servo optical beam LS and the information optical beam LM1 which enter the objective lens 21.

At this time, the optical path formation section 90 makes the optical axes of the servo optical beam LS and the information optical beam LM1 align with each other. Moreover, the optical path formation section 90 makes their convergence states (divergence angles and the like) different from each other. This makes it possible to let them enter the objective lens 21, while shaping them so that the distance d between the focal points LS and FM1 is maintained.

Here, if there is the recording mark RM at the target position PG of the target mark layer YG of the optical disc 100, the information optical beam LM3 will be generated due to the recording mark RM that serves as a hologram, and emerge from the first surface 100A.

Figure 11:
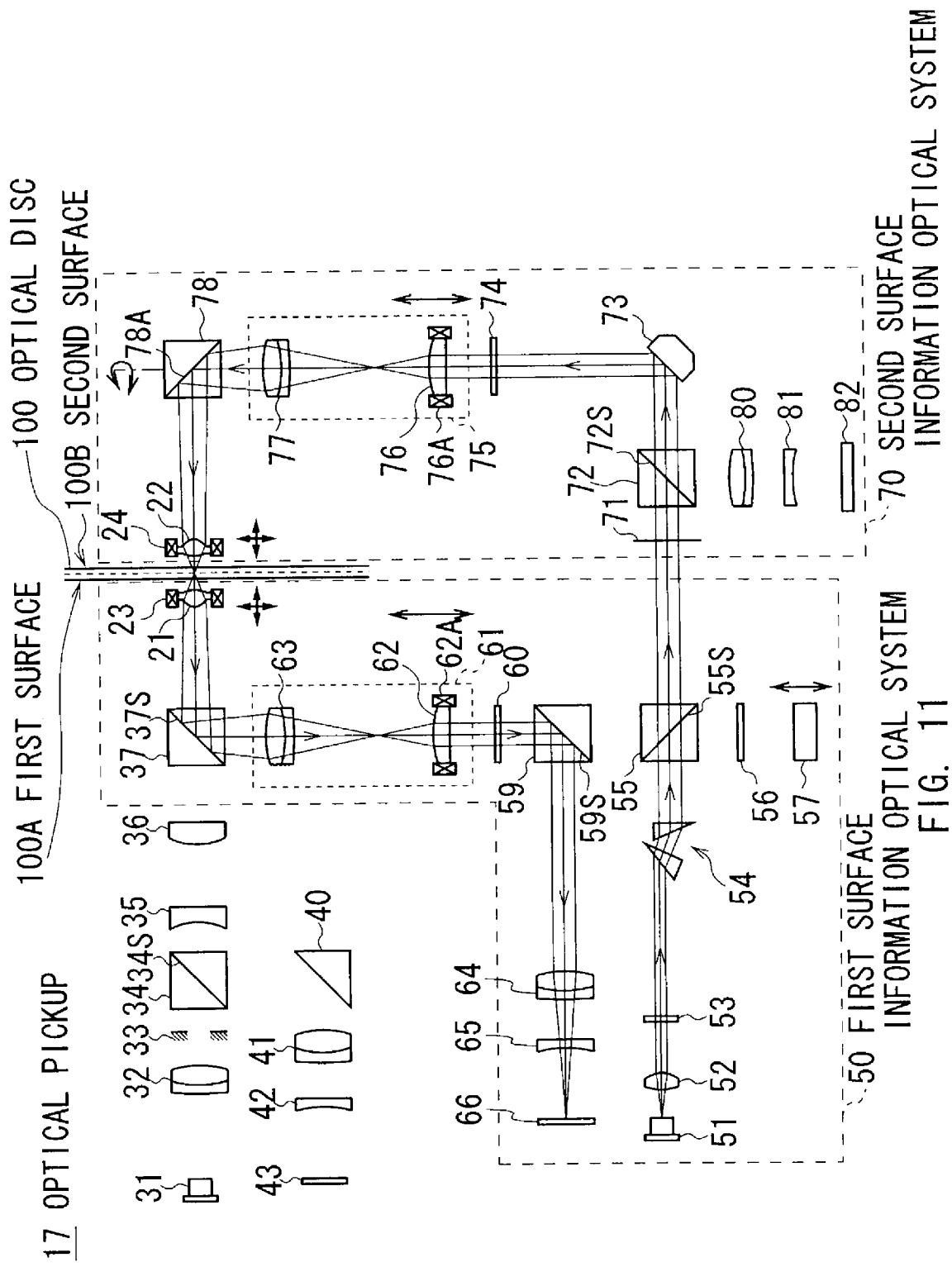
FIG. 11 is a schematic diagram illustrating an optical path of an optical beam according to the first embodiment (3)

As shown in FIG. 11, the objective lens 21 causes the information optical beam LM3 to converge. Then after reflected by the dichroic prism 37, the information optical beam LM3 enters the relay lens 61.

Subsequently, the information optical beam LM3 is converted by the fixed lens 63 and movable lens 62 of the relay lens 61 to the collimated information optical beam LM3. The information optical beam LM3 is then converted by the quarter-wave plate 60 from the circularly polarized (left-handed circularly polarized) to the linearly polarized (p-polarized) before entering the polarization beam splitter 59.

The polarization beam splitter 59 reflects the information optical beam LM3 according to the polarization direction of the information optical beam LM3, and lets it enter a condenser lens 64. The condenser lens 64 causes the information optical beam LM3 to converge, and a cylindrical lens 65 causes it to have astigmatism before leading it to a photodetector 66.

Here, the optical location, characteristics and other factors of each optical component of the first surface information optical system 50 are adjusted so that the state of the information optical beam LM1 focused on the target mark layer YG of the optical disc 100 by the objective lens 21 becomes associated with the state of the information optical beam LM3 focused on the photodetector 66 by the condenser lens 64.

Figure 8B:
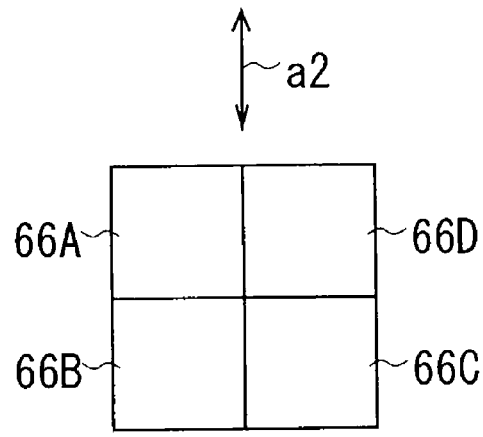

As shown in FIG. 8B, the photodetector 66 has a surface that receives the information optical beam LM3. This surface is divided in grid-like fashion into four detection areas 66A, 66B, 66C and 66D.

Each of the detection areas 66A, 66B, 66C and 66D detects part of the information optical beam LM3. Based on the detected intensity of the beam, they generate detection signals U2A, U2B, U2C and U2D (these signals are also collectively referred to as information detection signal U2, hereinafter), and transmit them to the signal processing section 13 (FIG. 5).

In that manner, the first surface information optical system 50 emits the information optical beam LM1 to the target mark layer YG of the optical disc 100, detects the information optical beam LM3 to generate the information detection signals U2 (i.e. the detection signals U2A, U2B, U2C and U2D), and supplies them to the signal processing section 13.

(1-3-3) Configuration of Second Surface Information Optical System

The second surface information optical system 70 (FIG. 11) is designed to emit the information optical beam LM2 to the second surface 100B of the optical disc 100 and receive the information optical beam LM1 that comes from the first surface information optical system 50 via the optical disc 100.

Incidentally, the second surface information optical system 70 is used only for recording information on the optical disc 100, and is not used for reproducing information from the optical disc 100.

As described above, the polarization beam splitter 55 of the first surface information optical system 50 allows about 50 percent of the p-polarized optical beam LM0 to pass through the reflection and transmission plane 55S, and lets it enter the shutter 71 as the information optical beam LM2.

The shutter 71, under the control of the control section 11 (FIG. 5), either blocks the information optical beam LM2 or allows it to pass therethrough. If the information optical beam LM2 is allowed to pass therethrough, it then enters a polarization beam splitter 72.

A reflection and transmission plane 72S of the polarization beam splitter 72, for example, is designed to allows about 100 percent of the p-polarized optical beam to pass therethrough, while reflecting almost 100 percent of the s-polarized optical beam. Actually, the polarization beam splitter 72 allows almost 100 percent of the p-polarized information optical beam LM2 to pass therethrough. Then after reflected by a mirror 73, the information optical beam LM2 is converted by a quarter-wave plate 74 from the linearly polarized (p-polarized) to the circularly polarized (left-handed circularly polarized) before entering a relay lens 75.

The configuration of the relay lens 75 is the same as that of the relay lens 61: a movable lens 76, a fixed lens 77 and an actuator 76A are almost the same as the movable lens 62, the fixed lens 63, and the actuator 62A, respectively.

The relay lens 75 uses the movable lens 76 to convert the collimated information optical beam LM2 into the converging information optical beam LM2. After that, it is converted into the diverging information optical beam LM2, and enters the fixed lens 77. The fixed lens 77 converts the diverging information optical beam LM2 into the converging information optical beam LM2, and leads it to a galvanometer mirror 78.

Moreover, in a similar way to the relay lens 61, the relay lens 75 can change the convergence state of the information optical beam LM2 coming out of the fixed lens 77 by using the movable lens 76: the movable lens 76 is driven by the actuator 76A under the control of the control section 11 (FIG. 5).

The galvanometer mirror 78 reflects the information optical beam LM2 and lets it enter the objective lens 22. Incidentally, when the circularly polarized information optical beam LM2 is reflected, its polarization direction is reversed, for example, from the left-handed circularly polarized to the right-handed circularly polarized.

Moreover, the angle of a reflection plane 78A of the galvanometer mirror 78 can be adjusted by a linear motor, a piezo element or the like: under the control of the control section 11 (FIG. 5), the angle of the reflection plane 78A is adjusted, thereby adjusting the traveling direction of the information optical beam LM2.

A two-axis actuator 24 is attached to the objective lens 22 as part of the objective lens 22. Thanks to the two-axis actuator 24, the objective lens 22 can move in two-axis direction, or in the focus or tracking directions (the objective lens 21 moves in a similar way).

The objective lens 22 causes the information optical beam LM2 to converge, and leads it to the second surface 100B of the optical disc 100.

At this time, as shown in FIG. 4, the information optical beam LM2 passes through the base plate 104 and is focused on the recording layer 101. Here, the position of the focal point FM2 of the information optical beam LM2 is determined by the convergence state of the information optical beam LM2 coming out of the fixed lens 77 of the relay lens 75.

By the way, the information optical beam LM1, collected by the objective lens 21 of the first surface information optical system 50 (FIG. 20), converges on the focal point FM1 inside the recording layer 101 of the optical disc 100, and then becomes a diverging beam. After that, it passes through the recording layer 101 and the base plate 104, comes out from the second surface 100B, and reaches the objective lens 22.

At this time, in the second surface information optical system 70, the objective lens 22 causes the information optical beam LM1 to converge to some extent. After that, the information optical beam LM1 is reflected by the galvanometer mirror 78, and then enters the relay lens 75. Incidentally, when the circularly polarized information optical beam LM1 is reflected by its reflection plane 78A, its polarization direction is reversed, for example, from the left-handed circularly polarized to the right-handed circularly polarized.

Subsequently, the information optical beam LM1 is converted by the fixed lens 77 and movable lens 76 of the relay lens 75 into the collimated information optical beam LM1. Moreover, it is converted by the quarter-wave plate 74 from the circularly polarized (right-handed circularly polarized) to the linearly polarized (s-polarized). After that, it is reflected by the mirror 73 before entering the polarization beam splitter 72.

The polarization beam splitter 72 reflects the information optical beam LM1 according to the polarization direction of the information optical beam LM1, and lets it enter a condenser lens 80. The condenser lens 80 causes the information optical beam LM1 to converge, and a cylindrical lens 81 causes it to have astigmatism. After that, the information optical beam LM1 is led to a photodetector 82.

Incidentally, the optical position, characteristics and other factors of each component of the second surface information optical system 70 are adjusted so that the distance between the focal point FM1 of the information optical beam LM1 and the focal point FM2 of the information optical beam LM2 in the recording layer 101 becomes associated with the emission state of the information optical beam LM2 focused by the condenser lens 80 on the photodetector 82.

Figure 8C:
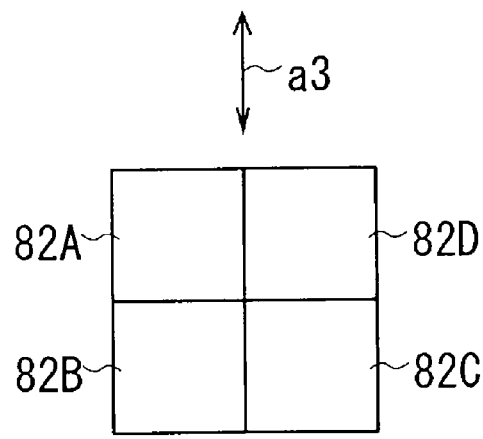

As shown in FIG. 8C, the photodetector 82 has a surface that receives the information optical beam LM1. This surface is divided in grid-like fashion into four detection areas 82A, 82B, 82C and 82D. Incidentally, an arrow a3 indicates a direction (the vertical direction in the diagram) along which a track runs on the reference layer 102 (FIG. 4) when the information optical beam LM1 is emitted to the optical disc 100.

Each detection area 82A, 82B, 82C and 82D of the photodetector 82 detects part of the information optical beam LM1, generates detection signals U3A, U3B, U3C and U3D (collectively referred to as "U3A to U3D," hereinafter) according to the detected intensity of the beam, and then supplies them to the signal processing section 13 (FIG. 5).

The signal processing section 13 calculates predetermined focus error signals and tracking error signals from the detection signals U3A to U3D, and supplies them to the drive control section 12.

The focus error signals and the tracking error signals represent a distance between the focal point FM1 of the information optical beam LM1 and the focal point FM2 of the information optical beam LM2 in the focus and tracking directions inside the recording layer 101 of the optical disc 100.

Based on the focus error signals and the tracking error signals, the drive control section 12 controls the two-axis actuator 24 and performs the focus control process and tracking control process of the objective lens 22 so that the focal point FM1 of the information optical beam LM1 is placed on the focal point FM2 of the information optical beam LM2.

Moreover, the signal processing section 13 calculates tangential error signals from the detection signals U3A to U3D, and supplies them to the drive control section 12.

The tangential error signals represent a distance between the focal point FM1 of the information optical beam LM1 and the focal point FM2 of the information optical beam LM2 in the tangential direction (which is the direction of a tangent to the track).

The drive control section 12 generates a tangential drive signal from the tangential error signal, and supplies it to the galvanometer mirror 78. The galvanometer mirror 78 therefore controls the angle of the reflection plane 78A to move the focal point FM2 of the information optical beam LM2 in the tangential direction so that it is placed on the focal point FM1 of the information optical beam LM1.

Accordingly, the optical disc device 10 can put the focal point FM2 of the information optical beam LM2 and the focal point FM1 of the information optical beam LM1 on the same place, thereby creating the recording mark RM, or the hologram, at the target position PG, as shown in FIG. 4.

(1-4) Focus Control and Tracking Control

The following describes how the optical disc device 10 performs the focus control process and the tracking control process. The optical disc device 10 uses the astigmatic method for the focus control process, and the push-pull method for the tracking control process.

(1-4-1) Generation of Focus Error Signal and Tracking Error Signal

From the servo detection signal U1 and information detection signal U2 supplied from the optical pickup 17, the signal processing section 13 calculates a focus error signal and a tracking error signal.

More specifically, the signal processing section 13 uses the following equation (1) to calculate the focus error signal SFE1 from the detection signals U1A to U1D (or the servo detection signal U1), and then supplies it to the drive control section 12.

$$SFE1 = (U1A + U1C) - (U1B + U1D) \tag{1}$$

This focus error signal SFE1 represents a distance between the focal point FS (FIG. 4) of the servo optical beam LS and the reference layer 102 of the optical disc 100 in the focus direction.

Moreover, the signal processing section 13 uses the following equation (2) to calculate the tracking error signal STE1 from the detection signals U1A to U1D (or the servo detection signal U1), and then supplies it to the drive control section 12.

$$STE1 = (U1A + U1B) - (U1C + U1D) \tag{2}$$

This tracking error signal STE1 represents a distance between the focal point FS (FIG. 4) of the servo optical beam LS and the target reference track TSG on the reference layer 102 of the optical disc 100 in the tracking direction.

Furthermore, the signal processing section 13 uses the following equation (3) to sequentially generate reproduction RF signals SRF from the target reference track TSG of the reference layer 102.

$$SRF = U1A + U1B + U1C + U1D \tag{3}$$

This reproduction RF signal SRF contains address information for tracks of the reference layer 102, and the like.

Furthermore, the signal processing section 13 uses the following equation (4) to calculate a focus error signal SFE2 from the detection signals U2A to U2D (or the information detection signal U2), and then supplies it to the drive control section 12.

$$SFE2 = (U2A + U2C) - (U2B + U2D) \tag{4}$$

This focus error signal SFE2 represents a distance between the focal point FM1 (FIG. 4) of the information optical beam LM1 and the target mark layer YG of the optical disc 100 in the focus direction.

Moreover, the signal processing section 13 uses the following equation (5) to calculate a tracking error signal STE2 from the detection signals U2A to U2D (or the information detection signal U2), and then supplies it to the drive control section 12.

$$STE2 = (U2A + U2B) - (U2C + U2D) \tag{5}$$

This tracking error signal STE2 represents a distance between the focal point FM1 (FIG. 4) of the information optical beam LM1 and the target position PG, which is on the target mark layer YG of the optical disc 100, in the tracking direction.

In that manner, the signal processing section 13 of the optical disc device 10 calculates focus error signals, tracking error signals and other signals from the servo detection signals U1 and the information detection signals U2.

(1-4-2) Focus Control with the Use of Reference Layer

Using the focus error signal SFE1, which was generated from the servo detection signal U1, the optical disc device 10 performs the focus control process.

Specifically, the drive control section 12 uses the following equation (6): the drive control section 12 multiplies the focus error signal SFE1, which was generated from the servo detection signal U1, and the focus error signal SFE2, which was generated from the information detection signal S2, by gain values G1 and G2 respectively, thereby calculating a composite focus error signal SFEC.

$$SFEC = G1 \cdot SFE1 + G2 \cdot SFE2 \tag{6}$$

The gain values G1 and G2 satisfy the following equations (7). Accordingly, in the equation (6), the ratio of the focus error signal SFE1 to the focus error signal SFE2 can be adjusted by changing the gain values G1 and G2.

$$G1 + G2 = 1$$

$$0 \leq G1 \leq 1$$

$$0 \leq G2 \leq 1 \tag{7}$$

At that time, the gain value G1 of the equation (6) is "1" while the gain value G2 is "0." Accordingly, the drive control section 12 performs the focus control process using only the focus error signal SFE1.

The drive control section 12 performs predetermined processes, such as filtering and amplification, for the composite focus error signal SFEC to generate a focus drive signal SFD, and then supplies it to the two-axis actuator 23 of the optical pickup 17. The two-axis actuator 23 therefore drives the objective lens 21 in the focus direction.

At this time, the optical disc device 10 performs the focus control process by performing a feedback process that repeats a series of processes in a way that causes the value of the composite focus error signal SFEC to converge on zero, thereby focusing the servo optical beam LS on the reference layer 102 of the optical disc 100 (this process is referred to as reference focus control process, hereinafter).

(1-4-3) Tracking Control with the Use of Target Mark Layer

Subsequently, the optical disc device 10 performs the tracking control process using the tracking error signal STE2, which was generated from the information detection signal U2.

Incidentally, the reason why the tracking control process follows the focus control process is that if the focal point of the information optical beam LM1 were far away from the target mark layer YG, the value of the tracking error signal STE2 wouldn't be appropriate, according to the principle of calculating the tracking error signals STE2.

The drive control process 12 performs predetermined processes, including filtering and amplification, for the tracking error signal STE2 to generate a tracking drive signal STD, and then supplies it to the two-axis actuator 23 of the optical pickup 17. The two-axis actuator 23 therefore drives the objective lens 21 in the tracking direction.

At this time, in a similar way to when performing the focus control process, the optical disc device 10 performs the tracking control process by performing a feedback process that repeats a series of processes in a way that causes the tracking error signal STE2 to converge on zero, thereby having the information optical beam LM1 tracking the target position PG on the target mark layer YG.

(1-4-4) Focus Control with the Use of Target Mark Layer

By the way, the control section 11 of the optical disc device 10 controls the above-described movable lens 62 of the relay lens 61 to adjust the distance between the focal point FS (FIG. 4) of the servo optical beam LS and the focal point FM1 of the information optical beam LM1.

Here, the control section 11 has a relay lens control table in ROM (not shown): on the table, each of the setting positions of the movable lens 62 is associated with each of the mark layers Y.

Actually, the control section 11 makes a determination as to which mark layer Y of the optical disc 100 is the target mark layer YG, and then reads out from the relay lens control table the corresponding setting position of the movable lens 62. The control section 11 then controls the relay lens 61 to place the movable lens 62 at that setting position.

Figure 1:
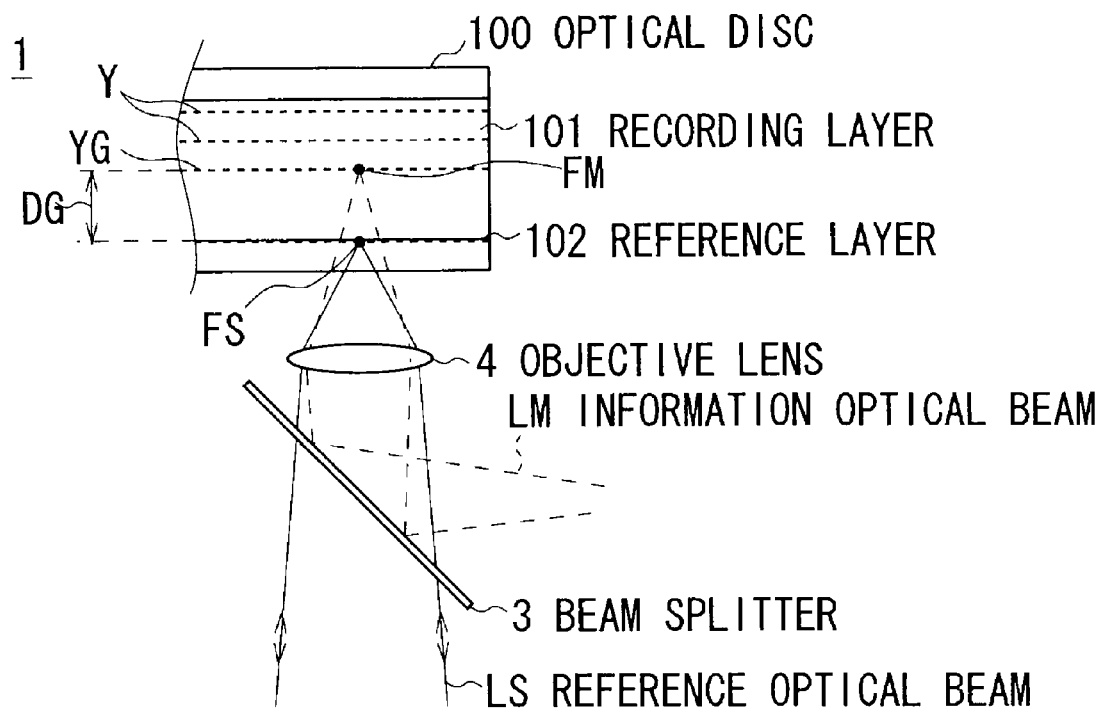
FIG. 1 is a schematic diagram illustrating the emission of optical beams to an optical disc.
Figure 2:
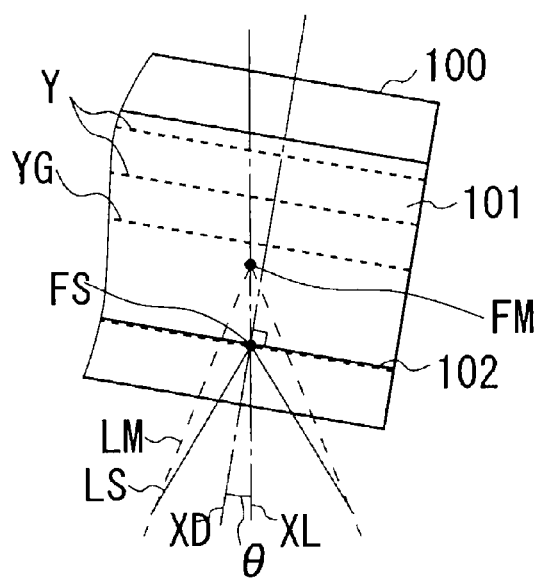
FIG. 2 is a schematic diagram illustrating the deviation of focal points caused by the tilting of an optical disc.

However, the fact of the matter is that the information optical beam LM1 may not be appropriately focused on the target mark layer YG of the optical disc 100 due to the axial run-out or the like (as illustrated in FIG. 2), even as the relay lens 61 is controlled and the servo optical beam LS is focused on the reference layer 102.

Accordingly, the optical disc device 10 starts performing a focus control process that uses the information detection signal U2 instead of the focus control process that uses the servo detection signal U1.

More specifically, the drive control section 12 monitors the tracking error signal STE2 and waits until the tracking error signal STE2 converges to some extent (i.e. it waits until the tracking servo is successfully carried out).

Figure 12A:
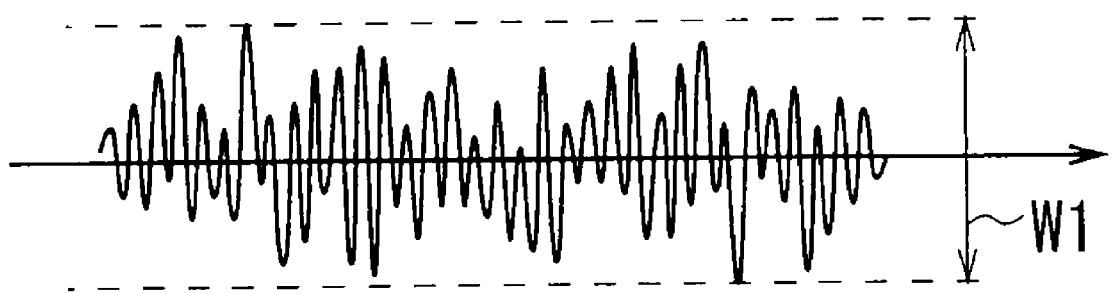
FIGS. 12A and 12B are schematic diagrams illustrating the convergence state of a tracking error signal.

Actually, before the tracking control process is completed (i.e. before the information optical beam LM1 is locked onto a desired track of the target mark layer YG), the amplitude of the tracking error signal STE2 is a relatively large w1, as shown in FIG. 12A, which shows its waveform.

Figure 12B:
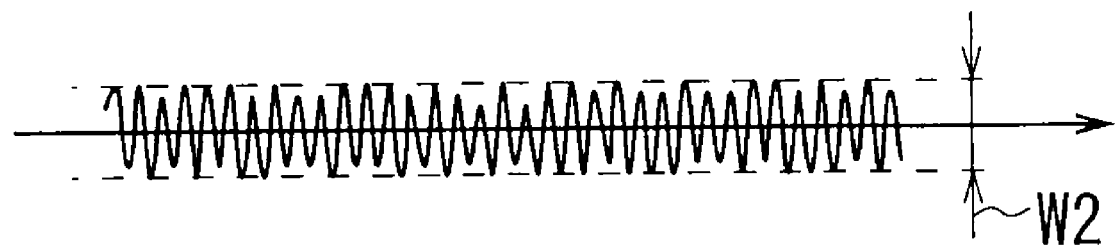

On the other hand, when the tracking control process is able to be completed (i.e. when the information optical beam LM1 is able to be locked onto a desired track of the target mark layer YG), the amplitude of the tracking error signal STE2 is a relatively small w2, as shown in FIG. 12B, which shows its waveform.

Accordingly, the drive control section 12 compares the amplitude of the tracking error signal STE2 with a predetermined threshold. The drive control section 12 regards a situation when the amplitude becomes less than the threshold as a situation when the tracking servo has been successfully completed.

Figure 13A:
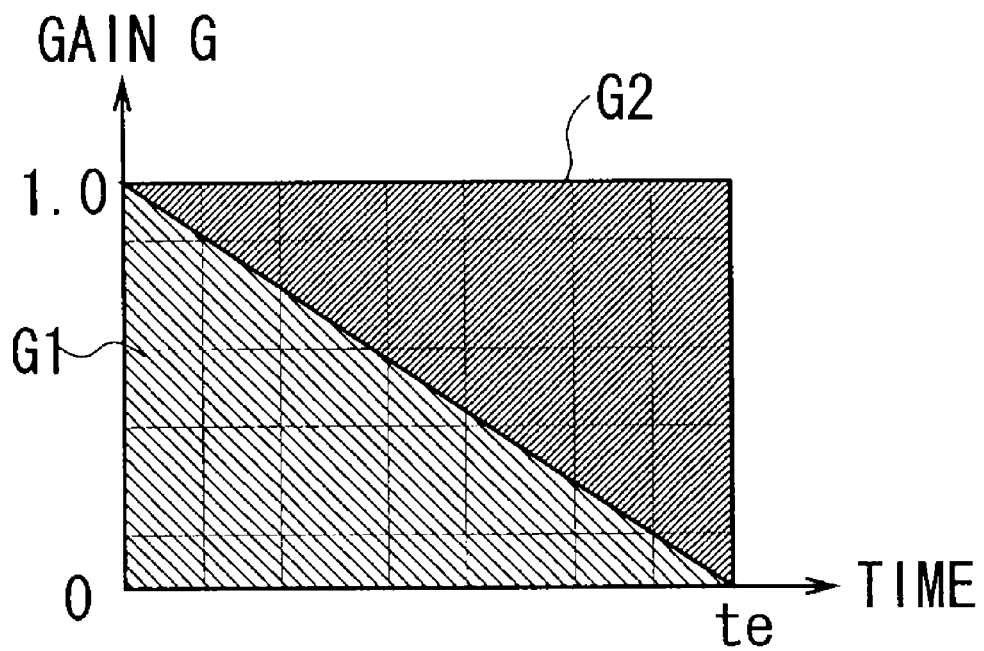
FIGS. 13A and 13B are schematic diagrams illustrating how a focus control process changes gain values of a detection signal.

At this time, as shown in FIG. 13A, while ensuring that the gain values G1 and G2 satisfy the equations (7), the drive control section 12 gradually reduces the gain value G1 to "0" and gradually increases the gain value G2 to "1."

As a result, after the time instant te, the drive control section 12 uses only the focus error signal SFE2 to perform the focus control process (also referred to as information focus control process, hereinafter).

Incidentally, if the focal point FM1 of the information optical beam LM1 increasingly deviates from the target position PG of the target mark layer YG and the deviation of the focus servo makes it difficult to continue the focus control process and the tracking control process, the drive control section 12 restarts the above-described reference focus control process and repeats a series of processes.

In this case, the drive control section 12 regards a situation when the absolute value of the focus error signal SFE2 becomes greater than a predetermined threshold as a situation when the deviation of the focus servo occurs.

In that manner, the drive control section 12 first performs the reference focus control process by using the reference layer 102 of the optical disc 100; after the tracking error signal STE2 converges to some extent, the drive control section 12 gradually switches from the reference focus control to the information focus control that uses the target mark layer YG of the optical disc 100.

(1-4-5) Procedure of Focus Control Process

Figure 14:
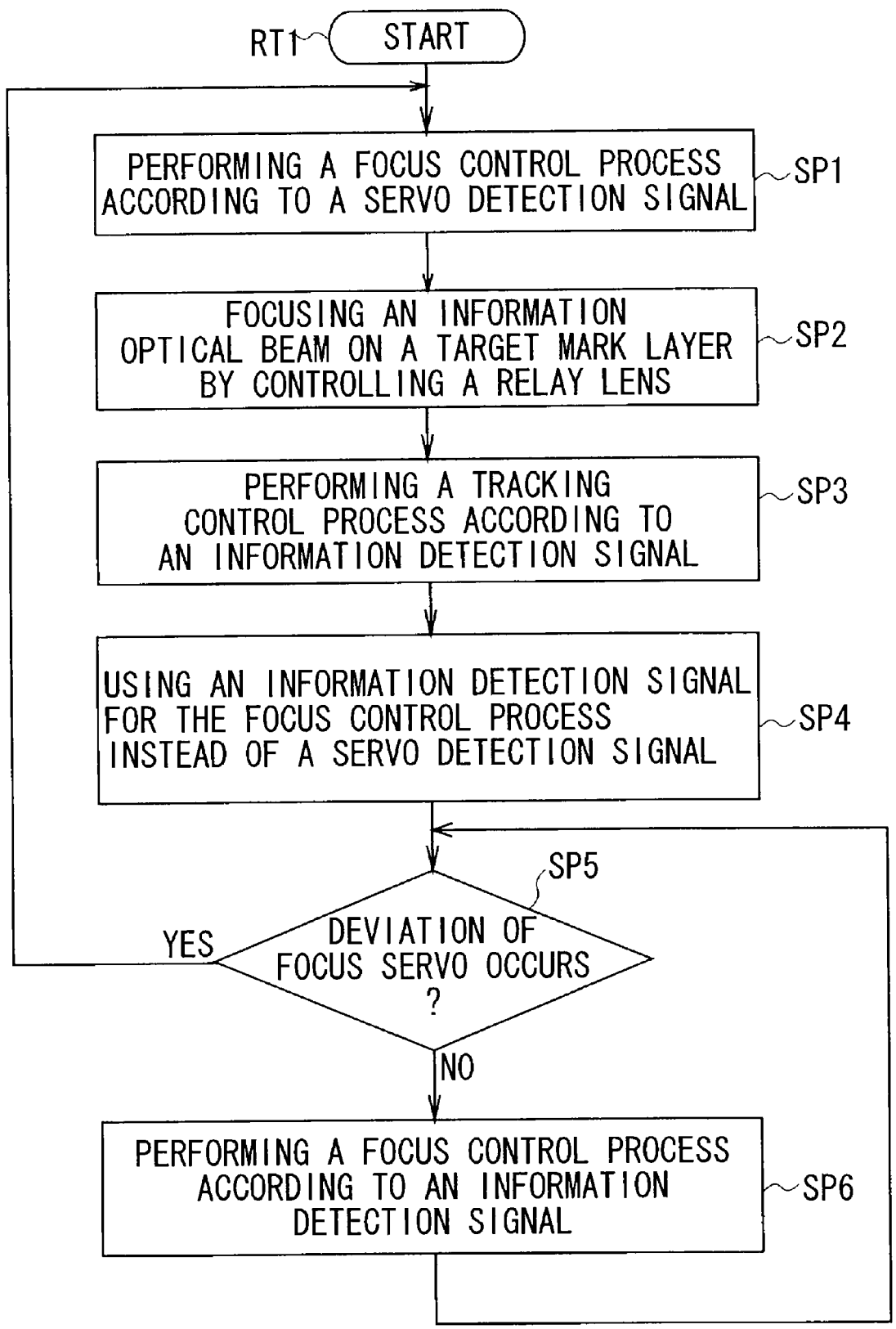
FIG. 14 is a schematic flowchart illustrating a focus control process procedure.

Actually, according to a flowchart shown in FIG. 14, the drive control section 12 performs a series of focus control processes.

When the playback of the optical disc 100 is started, the drive control section 12 receives a reproduction start command from the control section 11 and starts a focus control process procedure RT1; the drive control section 12 then proceeds to step SP1.

At step SP1, the drive control section 12 sets the gain values G1 and G2 (the equation (6)) to 1 and 0 respectively, and therefore uses the servo detection signal U1 to perform the reference focus control process that uses the reference layer 102. The drive control section 12 subsequently proceeds to next step SP2.

At step SP2, the drive control section 12 controls the relay lens 61 to move the movable lens 62, thus moving the focal point FM1 of the information optical beam LM1 until the focal point FM1 is located near the target mark layer YG. The drive control section 12 subsequently proceeds to next step SP3.

At step SP3, the drive control section 12 uses the information detection signal U2 to perform the tracking control process that uses the target mark layer YG, and then proceeds to next step SP4.

At step SP4, after the amplitude of the tracking error signal STE2 becomes less than the predetermined threshold, the drive control section 12 gradually changes the equation (6)'s gain values G1 and G2 (which had been 1 and 0 respectively) and finally sets the gain values G1 and G2 to 0 and 1 respectively. In this manner, the drive control section 12 gradually switches from the reference focus process to the information focus process, and then proceeds to next step SP5.

At step SP5, the drive control section 12 makes a determination as to whether the deviation of the focus servo has occurred, or whether the absolute value of the focus error signal SFE2 has exceeded the predetermined threshold. If the affirmative result is obtained, then this means that since the deviation of the focus servo occurs, the reference focus control process should be restarted from the beginning. In this case, the drive control section 12 returns to step SP1 to repeat a series of processes.

On the other hand, if the negative result is obtained at step SP5, then this means that the lock-in of the focus servo is maintained and therefore can be continued. In this case, the drive control section 12 proceeds to next step SP6.

At step SP6, the drive control section 12 maintains the information focus control and returns to step SP5, thereby continuing the information focus control process until the deviation of the focus servo occurs.

Incidentally, after the reproduction of information from the optical disc 100 ends, the drive control section 12 ends the focus control process procedure RT1.

(1-5) Operation and Effect

With the configuration described above, the optical disc device 10 emits the servo optical beam LS and the information optical beam LM1 to the objective lens 21 to reproduce information from the mark layer Y, which is located the distance d away from the reference layer 102 of the optical disc 100.

At this time, the optical path formation section 90 of the optical pickup 17 causes the optical axes of the servo optical beam LS and the information optical beam LM1 to align with each other and ensures that the distance between the focal points LS and FM1 is d. In this manner, the optical path formation section 90 shapes the optical paths of the servo optical beam LS and the information optical beam LM1.

Moreover, in the optical disc device 10, under the control of the control section 11, the objective lens 21 leads the servo optical beam LS and the information optical beam LM1 to the first surface 100A of the optical disc 100 so that they are focused on the optical disc 100.

The optical pickup 17 of the optical disc device 10 receives the servo reflection optical beam LSR, which is the servo optical beam LS reflected by the reference layer 102. Based on the servo reflection optical beam LSR, the optical pickup 17 generates the servo detection signal U1. At the same time, the optical disc device 10 receives the information optical beam LM2, which is the information optical beam LM1 reflected by the target mark layer YG. Based on the information optical beam LM3, the optical disc device 10 generates the information detection signal U2.

The signal processing section 13 calculates the focus error signal SFE1 and the tracking error signal STE1 from the servo detection signal U1, and the focus error signal SFE2 and the tracking error signal STE2 from the information detection signal U2.

The drive control section 12 first sets the gain values G1 and G2 (the equation (6)) to 1 and 0 respectively, and therefore performs the reference focus control based on the reference servo detection signal U1.

After the tracking error signal STE2 converges to some extent, the drive control section 12 gradually changes the gain values G1 and G2 (the equation (6)) to 0 and 1 respectively to gradually switch from the reference focus control to the information focus control which is based on the information detection signal U2.

Therefore, the optical disc device 10 finally starts the information focus control, which allows the optical disc device 10 to precisely place the focal point FM1 of the information optical beam LM1 on the target mark layer YG.

In this case, the optical disc device 10 first performs the reference focus control process, which is highly likely to detect an accurate value, to focus the servo optical beam LS on the reference layer 102. After the focal point FM1 of the information optical beam LM1 is placed near the target mark layer YG, the optical disc device 10 starts the information focus control process instead of the reference focus control process.

If a device performs only the information focus control process from the beginning, it is difficult to place the focal point FM1 of the information optical beam LM1 near the target mark layer YG, thereby making it almost impossible to obtain an accurate focus error signal SFE2. However, the optical disc device 10 can prevent this problem from happening. As a result, the optical disc device 10 can ensure the information focus control process.

By the way, inside the evenly-formed recording layer 101, there is nothing that can serve as a reference for positioning. Accordingly, once the focal point FM1 of the information optical beam LM1 completely deviates from the track, which is a series of recording marks, there is a danger that the optical disc device 10 misses the target mark layer YG and cannot perform the information focus control process.

As far as this point is concerned, the optical disc device 10 switches from the reference focus control process to the information focus control process after the amplitude of the tracking error signal STE2 becomes less than the predetermined threshold (i.e., after the tracking servo is carried out to cause the focal point FM1 of the information optical beam LM1 to follow the recording marks to some extent). Therefore, the optical disc device 10 can ensure the information focus control process.

Moreover, the optical disc device 10 gradually changes the gain values G1 and G2 (the equation (6)) in the range of between 0 and 1, and therefore gradually increases the use of the focus error signal SFE2 in the focus control process. Accordingly, even if the focal point FM1 of the information optical beam LM1 is located relatively far away from the target mark layer YG, it is possible for the optical disc device 10 to gradually move the focal point FM1 to the target mark layer YG. This can dramatically reduce the chance that the optical disc device 10 will miss the target mark layer YG.

According to the above configuration, the optical disc device 10 first performs the reference focus control process: the reference focus control process is based on the servo detection signal U1 which is acquired after the reception of the servo reflection optical beam LSR, which is the servo optical beam LS reflected by the reference layer 102. After the amplitude of the tracking error signal STE2 becomes less than the predetermined threshold, the optical disc device 10 starts, instead of the reference focus control process, the information focus control process: the information focus control process is based on the information detection signal U2 which is acquired after the reception of the information optical beam LM3, which is the information optical beam LM1 reflected by the target mark layer YG. Accordingly, without causing the focal point FM1 of the information optical beam LM1 to dramatically deviate from the target mark layer YG, the optical disc device 10 can appropriately perform the information focus control process, thus making it possible to precisely put the focal point FM1 of the information optical beam LM1 on the target mark layer YG.

Figure 15:
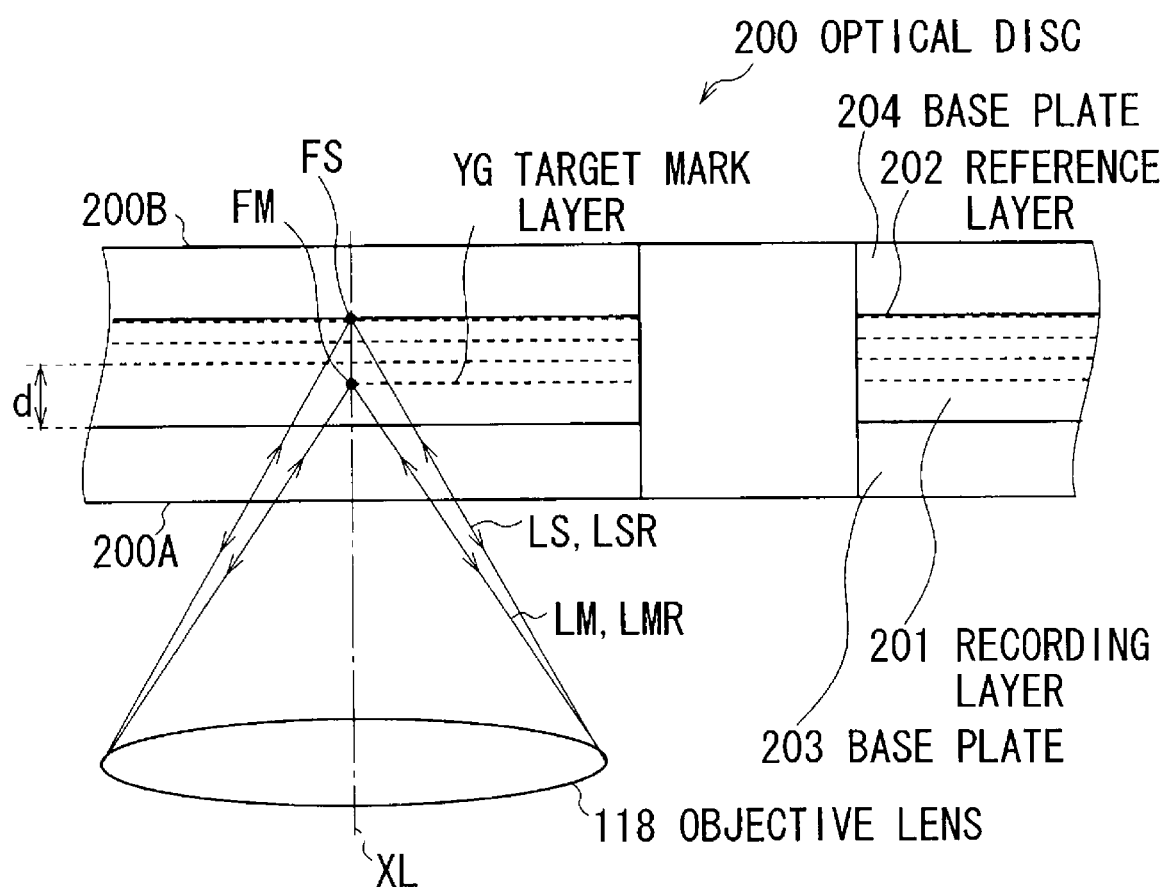
FIG. 15 is a schematic diagram illustrating the focusing of an optical beam according to a second embodiment of the present invention.

(2) Second Embodiment (2-1) Basic Concept for Recording and Reproducing Information from Optical Discs The following describes the basic concept of a second embodiment for recording and reproducing information. As shown in FIG. 15 (which can be compared with FIG. 4), which illustrates a cross section of an optical disc 200, the optical disc 200 includes a recording layer 201, a reference layer 202, and base plates 203 and 204: the recording layer 201, the reference layer 202, and the base plates 203 and 204 correspond to the optical disc 100's recording layer 101, reference layer 102, and base plates 103 and 104, respectively.

The recording layer 201 is produced by mixing predetermined photoinitiators with resin materials and solidifying them. If an information optical beam LM is focused on it, temperatures rapidly increase around its focal point FM, thereby vaporizing the residues of the photoinitiators. This creates air bubbles around the focal point.

In this case, the formed cavity serves as a recording mark RM. Since the difference in refraction index between the inside and outside of the cavity (i.e. between the resin of the recording layer 201 and the inside of the cavity) is large, most of the emitted optical beam is reflected by the surface of the recording mark RM.

The reference layer 202 includes a guide groove for servo, like the one in the reference layer 102, but the guide groove of the reference layer 202 is different from that of the reference layer 102. The guide groove is situated on the boundary between the recording layer 201 and the base plate 204. Moreover, when the reference layer 202 is exposed to a servo optical beam LS, which is a blue laser beam with wavelength of 405 nm, the reference layer 202 reflects it toward the reference layer 203 as a servo reflection optical beam LSR.

An optical disc device 110 receives the servo reflection optical beam LSR. Based on the received servo reflection optical beam LSR, the optical disc device 110 controls the position of an objective lens 118 in the focus direction so that the objective lens 118 moves close to or away from the optical disc 200, thereby putting the focal point FS of the servo optical beam LS on the reference layer 202.

Actually, in order to record information on the optical disc 200, the optical disc device 110 controls the objective lens 118 to lead the information optical beam LM to a first surface 200A, thereby making a recording mark RM around the focal point FM inside the recording layer 201.

Like the first embodiment, in the recording layer 201, a plurality of mark layers Y are formed as the focal point FM of the information optical beam LM moves in the direction of thickness of the optical disc 200. For example, the mark layers Y are sequentially formed from the first surface 200A of the optical disc 200 toward the other side, with a predetermined space between adjoining layers.

On the other hand, in order to reproduce information from the optical disc 200, the optical disc device 110 focuses the information optical beam LM on the recording layer 201. The formed recording marks RM reflect the information optical beam LM as a reflection information optical beam LMR. The optical disc device 110 receives the reflection information optical beam LMR.

Incidentally, like the first embodiment, the optical disc device 110 associates the portion where there is the recording mark RM with a symbol "1," and the portion where there is no recording mark RM with a symbol "0." This allows the optical disc device 100 to reproduce recorded information.

In that manner, in the second embodiment, in order to reproduce information from the optical disc 200, the optical disc device 110 emits, with the help of the servo optical beam LS, the information optical beam LM to the target position TG, thereby reproducing desired information.

(2-2) Configuration of Optical Disc Device and Optical Pickup

Figure 16:
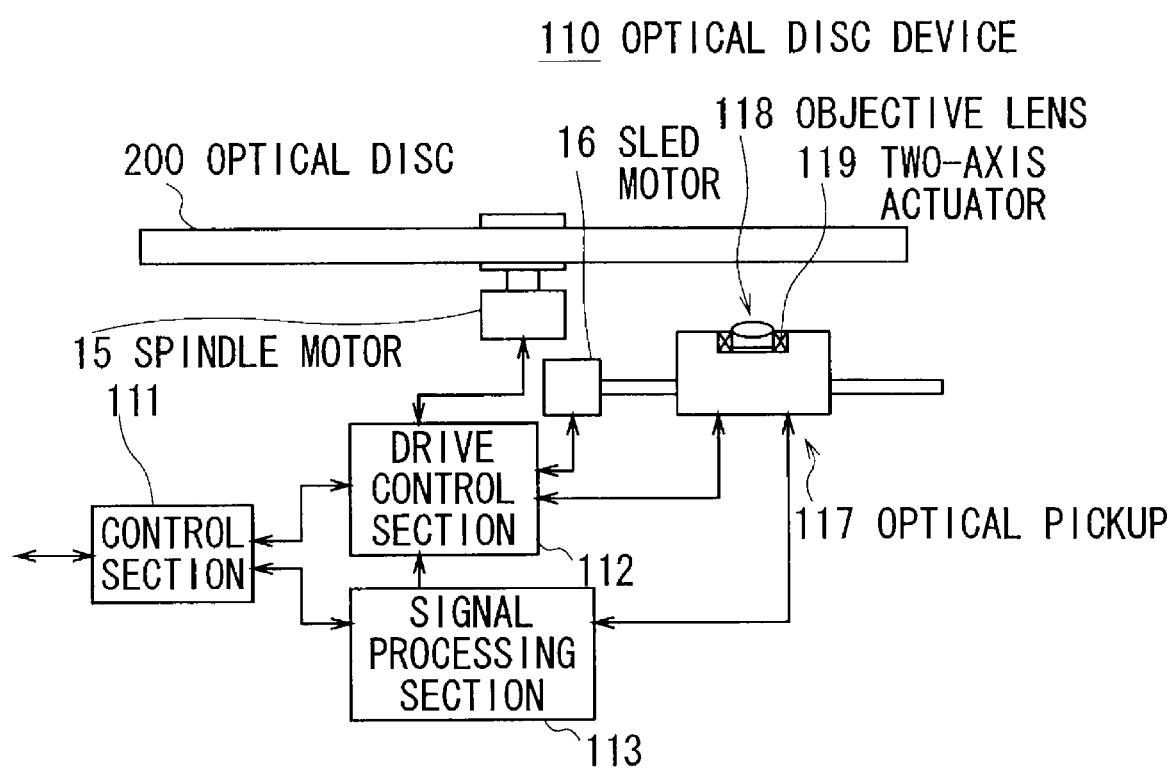
FIG. 16 is a schematic diagram illustrating the overall configuration of an optical disc device according to the second embodiment.

As shown in FIG. 16 (which can be compared with FIG. 5), the optical disc device 110 of the second embodiment includes a control section 111, a drive control section 112, a signal processing section 113 and an optical pickup 117, while the optical disc device 10 of the first embodiment includes the control section 11, the drive control section 12, the signal processing section 13 and the optical pickup 17. Incidentally, the other part of the optical disc device 110 is almost the same as the optical disc device 10.

Figure 17:
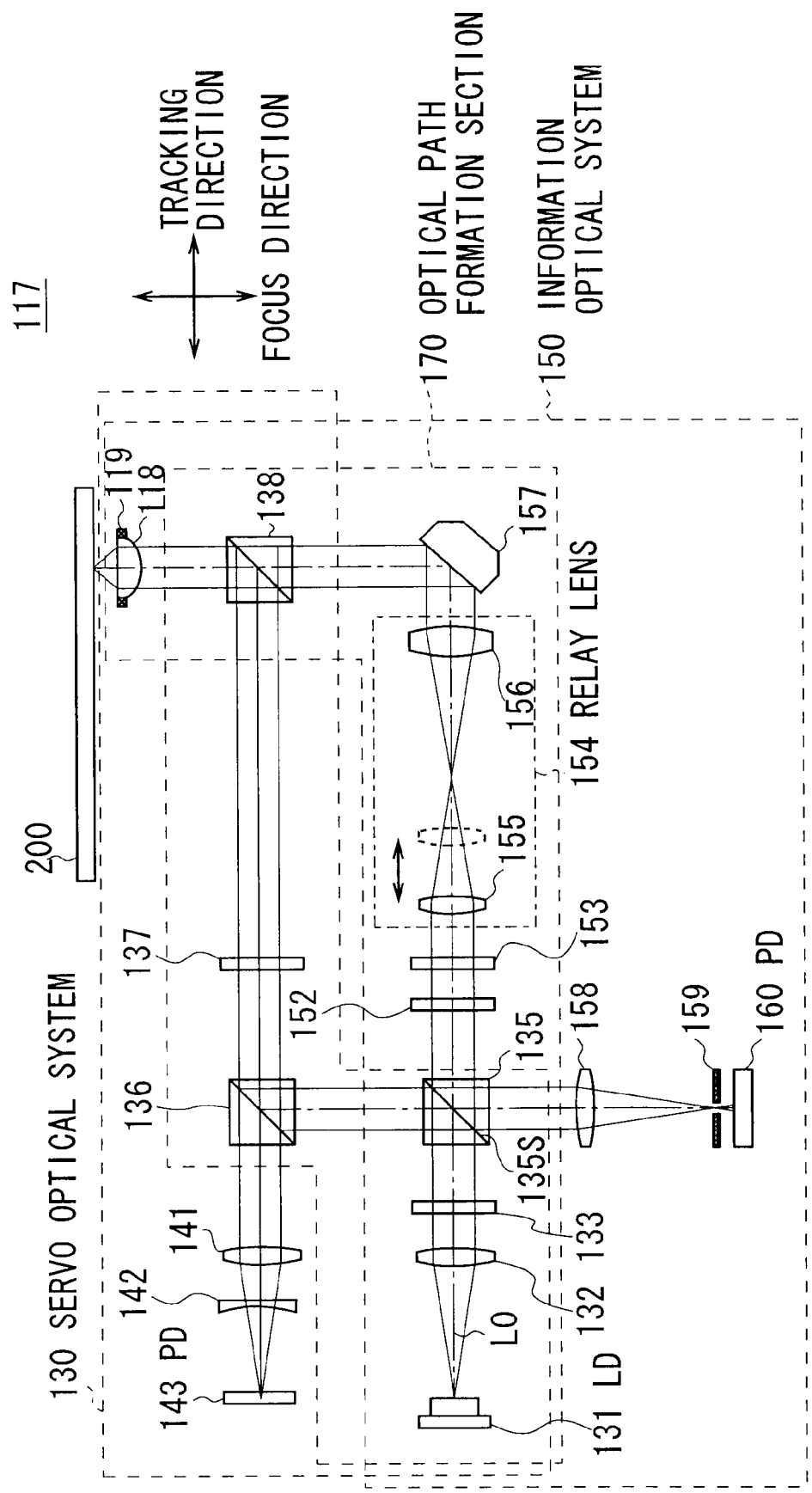
FIG. 17 is a schematic diagram illustrating the configuration of an optical pickup according to the second embodiment.

As shown in FIG. 17, the optical pickup 117 includes many optical components, but is different from the optical pickup 17 of the first embodiment. The optical pickup 117 is a so-called one-surface optical system, many optical components of which are provided only for the first surface 200A of the optical disc 200.

This optical pickup 117 contains two systems: a servo optical system 130, which corresponds to the servo optical system 30, and an information optical system 150, which corresponds to the first surface information optical system 50.

(2-2-1) Configuration of Servo Optical System

Figure 18:
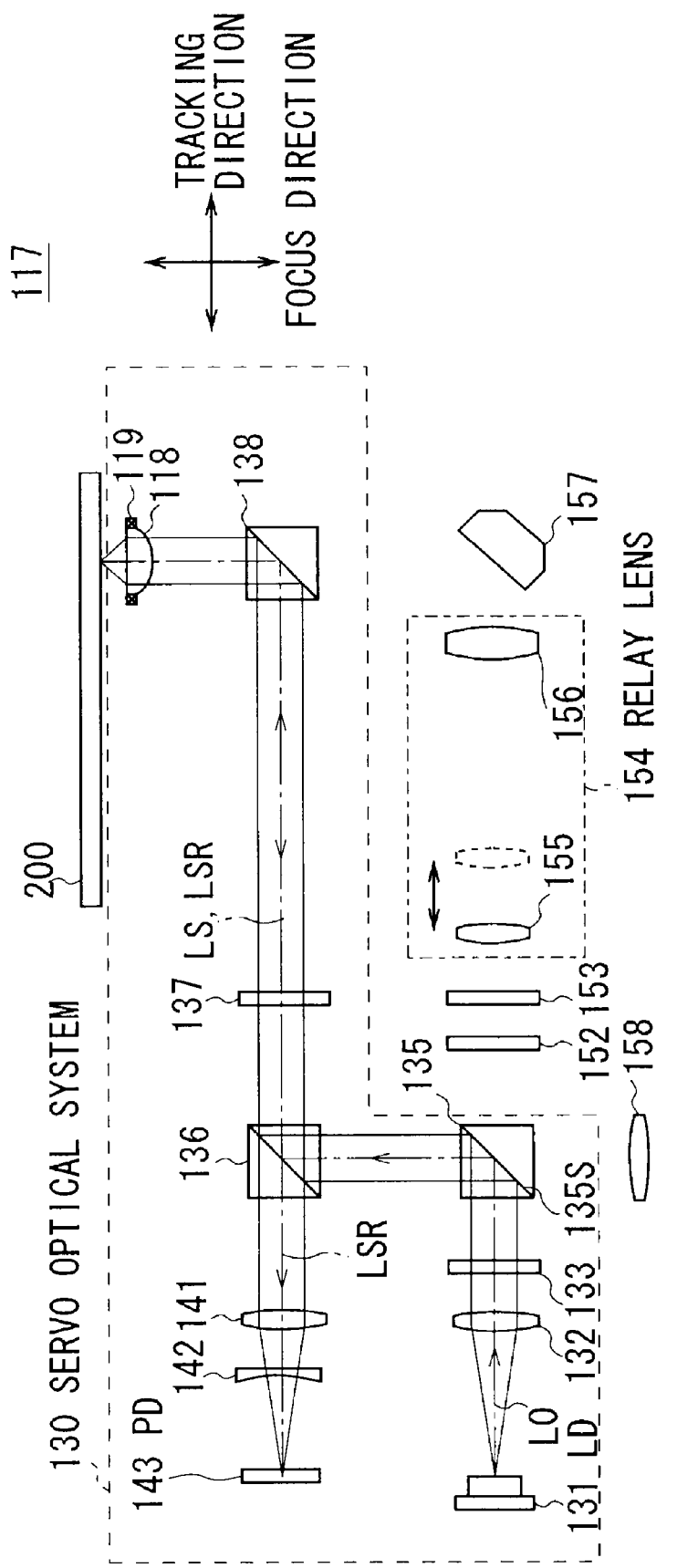
FIG. 18 is a schematic diagram illustrating an optical path of an optical beam according to the second embodiment.

As shown in FIG. 18, the objective lens 118 of the servo optical system 130 primarily causes the servo optical beam LS to converge, and leads it to the reference layer 202 (FIG. 15) of the optical disc 200.

More specifically, in the servo optical system 130, a laser diode 131 emits the information optical beam LM, which is a blue laser beam with wavelength of about 405 nm, to a collimator lens 132. Actually, under the control of the control section 111 (FIG. 16), the laser diode 131 emits a predetermined intensity of a diverging optical beam L0. The collimator lens 132 collimates the diverging optical beam L0 and then leads it to a half-wave plate 133.

The polarization direction of the optical beam L0 is rotated by the half-wave plate 133 through a predetermined angle. As a result, for example, about 80 percent of the optical beam L0 is the p-polarized, and about 20 percent the s-polarized. The optical beam L0 then enters a polarization beam splitter 135.

The polarization beam splitter 135 includes a reflection and transmission plane 135S. The reflection and transmission plane 135S reflects part of the incoming optical beam while allowing the remaining part of the beam to pass therethrough: the ratio of reflection to transmission varies according to the polarization direction of the optical beam. For example, the reflection and transmission plane 135S allows most of the p-polarized optical beam to pass therethrough, while reflecting most of the s-polarized optical beam.

Actually, the polarization beam splitter 135 reflects the s-polarized part of the optical beam L0, and leads it to a polarization beam splitter 136 as a servo optical beam LS.

Moreover, the polarization beam splitter 135 allows the p-polarized part of the optical beam L0 to pass therethrough, and leads it to a liquid crystal panel 152 as an information optical beam LM.

The polarization beam splitter 136 includes a reflection and transmission plane 136S, which works in the same way as the reflection and transmission plane 135S of the polarization beam splitter 135. The reflection and transmission plane 136S reflects the s-polarized servo optical beam LS, and lets it enter a quarter-wave plate 137.

The quarter-wave plate 137 converts the s-polarized servo optical beam LS into, for example, the left-handed circularly polarized servo optical beam LS, and lets it enter a non-polarization beam splitter 138. The non-polarization beam splitter 138 for example reflects about 50 percent of an optical beam while allowing the rest of it to pass therethrough. Accordingly, the non-polarization beam splitter 138 reflects the servo optical beam LS and lets it enter the objective lens 118.

The objective lens 118 causes the servo optical beam LS to converge, and leads it to the reference layer 202 of the optical disc 200. At this time, as shown in FIG. 15, the servo optical beam LS passes through the base plate 203 and the recording layer 201, and is reflected by the reference layer 202 to become a servo reflection optical beam LSR.

After that, the servo reflection optical beam LSR passes through the recording layer 201 and the base plate 203 in that order, and is collimated by the objective lens 118 before entering the non-polarization beam splitter 138. A reflection and transmission plane 138S of the non-polarization beam splitter 138 reflects about 50 percent of the servo reflection optical beam LSR and lets it enter the quarter-wave plate 137.

The quarter-wave plate 137 converts the right-handed circularly polarized servo reflection optical beam LSR into the p-polarized servo reflection optical beam LSR, and lets it enter the polarization beam splitter 136. The polarization beam splitter 136 allows the p-polarized servo reflection optical beam LSR to pass therethrough, and lets it enter a condenser lens 141.

The condenser lens 141 causes the servo reflection optical beam LSR to converge. Then a cylindrical lens 142 causes the servo reflection optical beam LSR to have astigmatism before leading it to a photodetector 143.

Here, the optical positions, characteristics and other factors of each optical component of the servo optical system 130 are adjusted so that the state of the servo optical beam LS focused by the objective lens 118 on the reference layer 202 of the optical disc 200 becomes associated with the state of the servo reflection optical beam LSR focused by the condenser lens 141 on the photodetector 143.

Figure 19A:
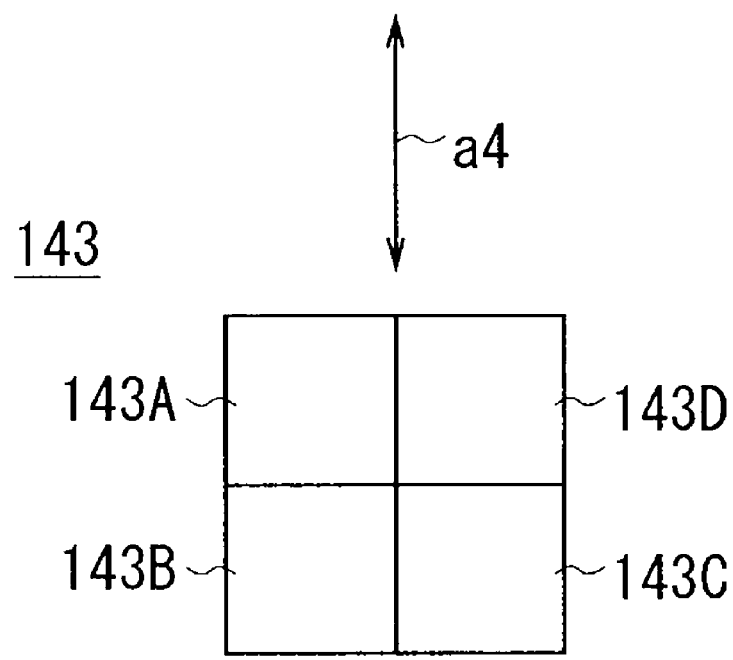
FIGS. 19A and 19B are schematic diagrams illustrating the configuration of detection areas of a photodetector.

As shown in FIG. 19A, the photodetector 143 has a surface that receives the servo reflection optical beam LSR: the surface is divided in grid-like manner into four detection areas 143A, 143B, 143C and 143D. Incidentally, an arrow a4 represents a direction (i.e. the vertical direction in the diagram) along which a track runs when the servo optical beam LS is emitted to the reference layer 202 (FIG. 15).

Each of the detection areas 143A, 143B, 143C and 143D of the photodetector 143 detects part of the servo reflection beam LSR. Based on the detected intensity, the detection areas 143A, 143B, 143C and 143D generate detection signals U1A, U1B, U1C and U1D (i.e. the servo detection signal U1), and supply them to the signal processing section 113 (FIG. 16).

In this manner, the servo optical system 130 emits the servo optical beam LS to the reference layer 202 of the optical disc 200, and detects the servo reflection optical beam LSR to generate the servo detection signal U1, which the servo optical system 130 then supplies to the signal processing section 113.

(2-2-2) Optical Path of Information Optical Beam

Figure 20:
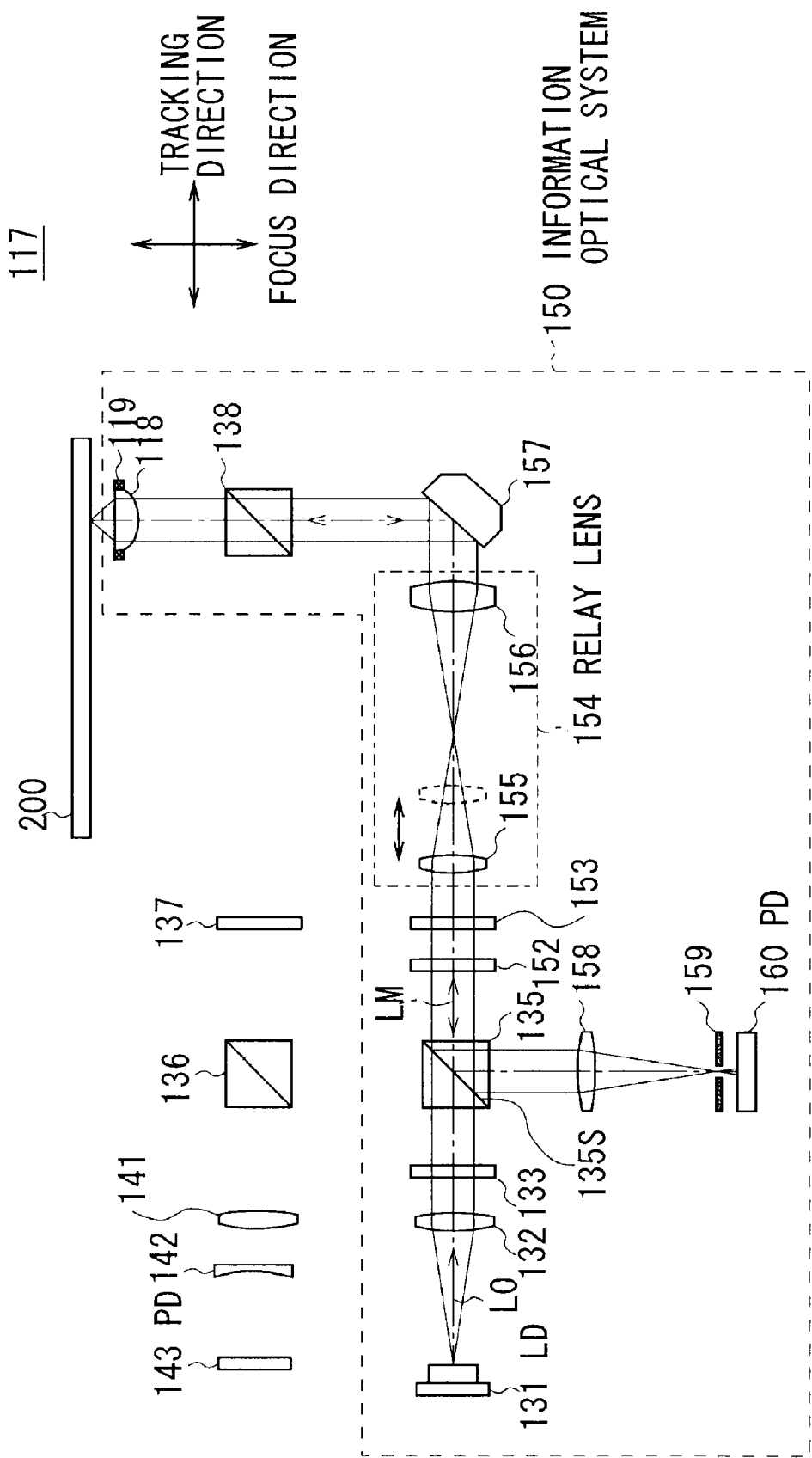
FIG. 20 is a schematic diagram illustrating an optical path of an optical beam according to the second embodiment.

On the other hand, as shown in FIG. 20 (which can be compared with FIG. 17), the information optical system 150 uses the objective lens 118 to focus the information optical beam LM on the target mark layer YG (FIG. 15) of the optical disc 200.

Specifically, the information optical system 150 leads the information optical beam LM, which emerged from the polarization beam splitter 135, to the liquid crystal panel 152.

The liquid crystal panel 152 corrects spherical aberration in the information optical beam LM, and lets the information optical beam LM enter the quarter-wave plate 153. The quarter-wave plate 153 for example converts the p-polarized information optical beam LM into the right-handed circularly polarized information optical beam LM before letting it enter a relay lens 154.

A movable lens 155 of the relay lens 154 converts the collimated information optical beam LM into the converging information optical beam LM. Subsequently, the information optical beam LM is converted into the diverging information optical beam LM, and is then converted by a fixed lens 156 into the converging information optical beam LM before reaching a mirror 157.

Here, the movable lens 155 is driven by an actuator (not shown) in a direction of the optical axis of the information optical beam LM. Actually, under the control of the control section 111 (FIG. 16), the actuator of the relay lens 154 moves the movable lens 155 to change the convergence state of the information optical beam LM emerging from the fixed lens 156.

The mirror 157 reflects the information optical beam LM, and reverses the polarization direction of the circularly polarized information optical beam LM before letting it enter the non-polarization beam splitter 138. The reflection and transmission plane 138S of the non-polarization beam splitter 138 allows about 50 percent of the information optical beam LM to pass therethrough, and leads it to the objective lens 118.

The objective lens 118 focuses the information optical beam LM. Here, a distance between the focal point FM of the information optical beam LM and the focal point FS of the servo optical beam LS in the focus direction is determined based on the divergence angle of the information optical beam LM emerging from the relay lens 154.

Actually, the position of the movable lens 155 of the relay lens 154 is controlled so that the distance between the focal point FM and the focal point FS in the focus direction becomes equal to the distance between the reference layer 202 and the target mark layer YG. Moreover, the focus control process is performed for the objective lens 118 so that the servo optical beam LS is focused on the reference layer 202 (described in detail later).

Accordingly, as shown in FIG. 15, thanks to the objective lens 118, the information optical beam LM is focused on the target mark layer YG inside the recording layer 201.

This means that in the servo optical system 130 and the information optical system 150, as shown in FIG. 17, an optical path formation section 170 including the laser diode 131, the collimator lens 132, the relay lens 154 and the like appropriately shapes the servo optical beam LS and the information optical beam LM, which enter the objective lens 118.

If there is the recording mark RM on the target position PG on the target mark layer YG of the optical disc 200, the information optical beam LM becomes the information reflection optical beam LRM after being reflected by the recording mark RM. The information reflection optical beam LMR then emerges from the first surface 200A.

The rotation direction of the circularly polarized information reflection optical beam LMR is reversed at a time when it is reflected by the target mark layer YG of the optical disc 200. After that, the objective lens 118 causes the information reflection optical beam LMR to converge and leads it to the non-polarization beam splitter 138.

After that, about 50 percent of the information reflection optical beam LMR passes through the non-polarization beam splitter 138, is reflected by the mirror 157, and is collimated by the relay lens 154. The information reflection optical beam LMR then passes through the quarter-wave plate 153 and the liquid crystal panel 152 in that order and enters the polarization beam splitter 135 as the linearly polarized (s-polarized) optical beam.

The reflection and transmission plane 135S of the polarization beam splitter 135 reflects the s-polarized information optical beam LMR, leading it to a condenser lens 158. The condenser lens 158 focuses the information optical beam LMR on a photodetector 160 via a pinhole plate 159.

Figure 21:
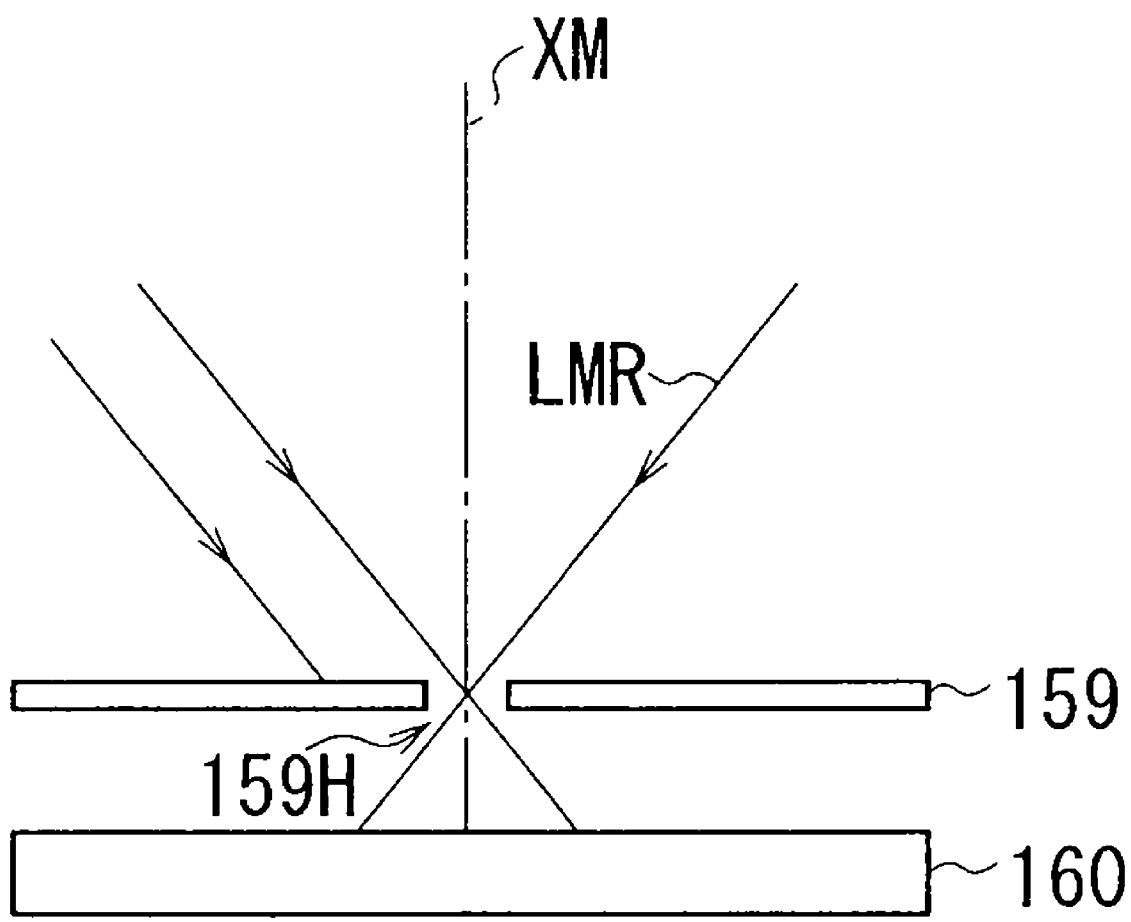
FIG. 21 is a schematic diagram illustrating the selection of an optical beam by a pinhole.

As shown in FIG. 21, the pinhole plate 159 is located so that the focal point of the information reflection beam LMR, focused by the condenser lens 158 (FIG. 20), is positioned in a hole 159H, allowing the information reflection optical beam LMR to pass therethrough.

On the other hand, if part of the information optical beam LM was reflected by the surface of the base plate 203 of the optical disc 200, the recording marks RM that are different from the one at the target mark position, the reference layer 202 or the like, an optical beam whose focal point is different from that of the information reflection optical beam LMR (referred to as stray beam LN, hereinafter) would emerge. The pinhole plate 159 blocks most of the stray beam LN.

Figure 19B:
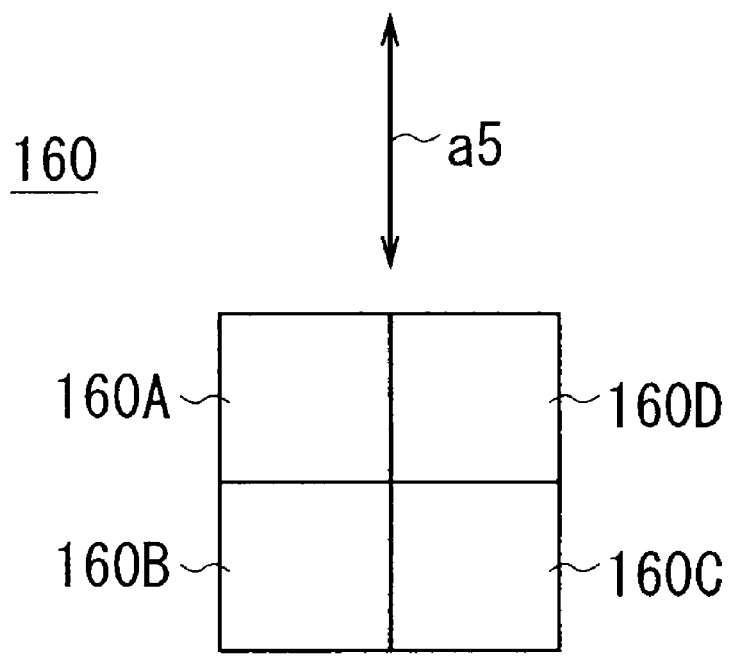

As shown in FIG. 19B, the photodetector 160 has a surface that receives the information reflection optical beam LMR. This surface is divided in grid-like fashion into four detection areas 160A, 160B, 160C and 160D.

Each of the detection areas 160A, 160B, 160C and 160D detects part of the information reflection optical beam LMR. Based on the detected intensity of the beam, they generate detection signals U2A, U2B, U2C and U2D (i.e. the information detection signal U2), and transmit them to the signal processing section 113 (FIG. 16).

In that manner, the information optical system 150 emits the information optical beam LM to the target mark layer YG of the optical disc 200, detects the information reflection optical beam LMR to generate the information detection signal U2, and supplies it to the signal processing section 113.

(2-3) Focus Control and Tracking Control

The following describes how the optical disc device 110 performs the focus control process and the tracking control process. Like the optical disc device 10 of the first embodiment, the optical disc device 110 uses the astigmatic method for the focus control process, and the push-pull method for the tracking control process.

The signal processing section 113 calculates the focus error signal SFE1, the tracking error signal STE1 and the reproduction RF signal SRF from the servo detection signal U1 supplied from the optical pickup 117, according to the above-described equations (1) to (3).

Moreover, the signal processing section 113 calculates the focus error signal SFE2 and the tracking error signal STE2 from the information detection signal U2 supplied from the optical pickup 117, according to the above-noted equations (4) and (5).

The drive control section 112 calculates the composite focus error signal SFEC according to the above-noted equation (6). Based on the composite focus error signal SFEC, the drive control section 112 generates the focus drive signal SFD, and supplies it to an two-axis actuator 119 of the optical pickup 117. Therefore, the two-axis actuator 119 drives the objective lens 118 in the focus direction.

At this time, the drive control section 112 switches from the reference focus control process to the information focus control process in a similar way to the first embodiment. However, the speed at which the drive control section 112 switches from the reference focus control to the information focus control is instant, i.e. far faster than the first embodiment.

Figure 13B:
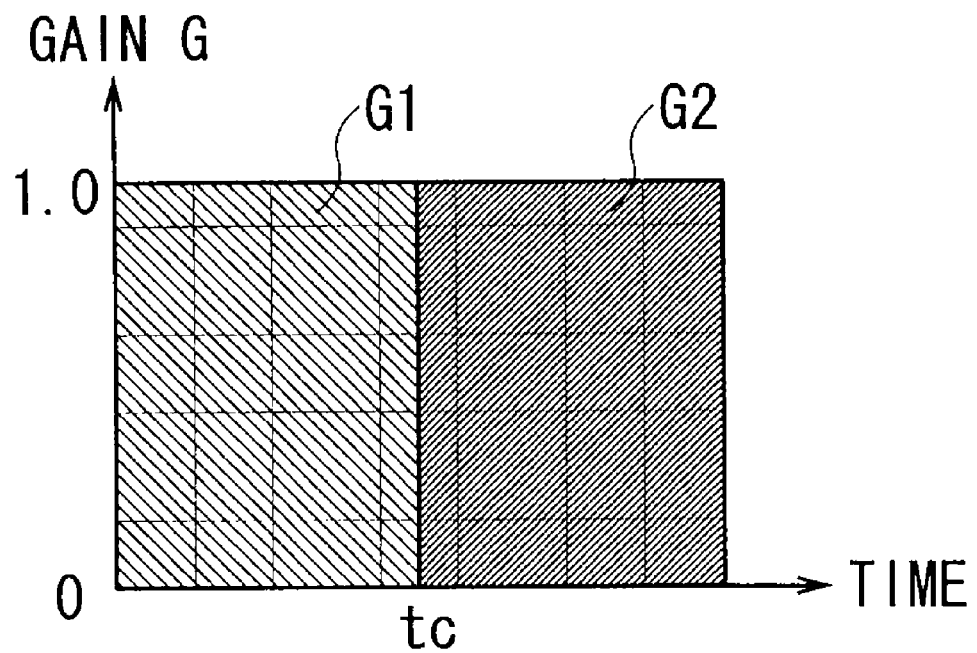

Specifically, the drive control section 112 performs a series of focus control processes according to the focus control process procedure RT1 (FIG. 14), in a similar way to the first embodiment. Here, at step SP4 of the focus control process procedure RT1, the drive control section 112, at the time instant tc, changes the gain value G1 from 1 to 0, and the gain value G2 from 0 to 1, as shown in FIG. 13B.

Thus, the drive control section 112 can swiftly switches from the reference focus control to the information focus control.

(2-4) Control of Relay Lens

Furthermore, the optical disc device 110 controls the position of the movable lens 155 of the relay lens 154 using the information detection signal U2, in a similar way to when it controls the objective lens 118.

Specifically, under the control of the control section 111, the optical disc device 110 moves the movable lens 155 so that the focal point FM of the information optical beam LM is positioned around the target mark layer YG. Subsequently, in the optical disc device 110, the drive control section 112 fine adjusts the position of the movable lens 155 so that the focus error signal SFE2 approaches zero.

Thus, in the optical disc device 110, the focal point FM of the information optical beam LM is precisely positioned on the target mark layer YG.

Figure 22:
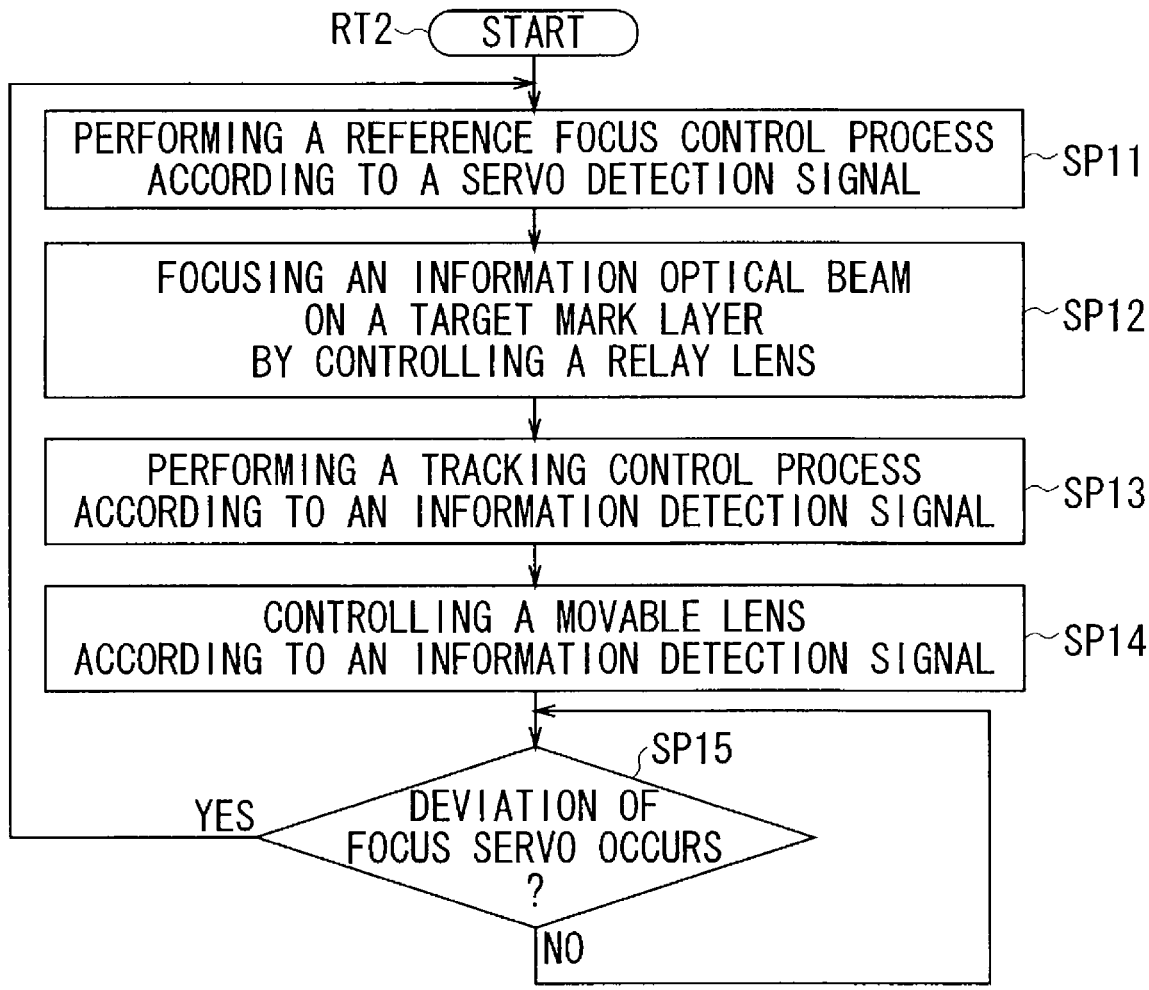
FIG. 22 is a schematic flowchart illustrating a relay lens control process procedure.

Actually, the drive control section 112 performs a series of focus control processes according to a flowchart shown in FIG. 22.

Before starting reproduction of information from the optical disc 200, the drive control section 112 receives a reproduction start command from the control section 111 (FIG. 16), and then starts a relay lens control process procedure RT2. The drive control section 112 proceeds to step SP11.

At step SP11, the drive control section 112 sets the gain values G1 and G2 (the equation (6)) to 1 and 0 respectively, and therefore uses the servo detection signal U1 to perform the reference focus control process. The drive control section 112 subsequently proceeds to next step SP12.

At step SP12, under the control of the control section 111 the drive control section 112 controls the relay lens 154 to move the movable lens 155, thus moving the focal point FM of the information optical beam LM until the focal point FM is positioned near the target mark layer YG. The drive control section 112 subsequently proceeds to next step SP13.

At step SP13, the drive control section 112 uses the information detection signal U2 to perform the tracking control process that uses the target mark layer YG, and then proceeds to next step SP14.

At step SP14, after the amplitude of the tracking error signal STE2 becomes less than the predetermined threshold, the drive control section 112 controls the position of the movable lens 155 so that the focus error signal SFE2 approaches zero, and then proceeds to next step SP15.

At step SP15, the drive control section 112 makes a determination as to whether the deviation of the focus servo has occurred, or whether the absolute value of the focus error signal SFE2 has exceeded the predetermined threshold. If the affirmative result is obtained, then this means that since the deviation of the focus servo occurs, the reference focus control process, which uses the reference layer 102, should be restarted from the beginning. In this case, the drive control section 112 returns to step SP11 to repeat a series of processes.

On the other hand, if the negative result is obtained at step SP15, then this means that the lock-in of the focus servo is maintained and therefore can be continued. In this case, the drive control section 112 returns to step SP15 after a predetermined period of time has passed.

Incidentally, when the reproduction of information from the optical disc 200 is completed, the drive control section 112 ends the relay lens control process procedure RT2.

(2-5) Operation and Effect

With the configuration described above, in order to reproduce information from the optical disc 200 in which the reference layer 202 is positioned away from the mark layer Y, the optical disc device 110 first emits the servo optical beam LS and the information optical beam LM to the objective lens 118.

At this time, the optical path formation section 170 of the optical pickup 117 causes the optical axes of the servo optical beam LS and the information optical beam LM to align with each other, and shapes them so that the distance between the focal points LS and FM is d.

Moreover, under the control of the control section 111, the objective lens 118 of the optical disc device 110 focuses the servo optical beam LS and the information optical beam LM on the optical disc 200 via its first surface 200A.

The optical pickup 117 of the optical disc device 110 receives the servo reflection optical beam LSR, which is the servo optical beam LS reflected by the reference layer 202; based on the received beam, the optical pickup 117 generates the servo detection signal U1. At the same time, the optical pickup 117 receives the information reflection optical beam LMR, which is the information optical beam LM reflected by the target mark layer YG; based on the received beam, the optical pickup 117 generates the information detection signal U2.

The signal processing section 113 calculates the focus error signal SFE1 and the tracking error signal STE1 from the servo detection signal U1, the focus error signal SFE2 and the tracking error signal STE2 from the information detection signal U2.

The drive control section 112 first sets the gain values G1 and G2 (the equation (6)) to 1 and 0 respectively, thereby performing the reference focus control process using the servo detection signal U1.

After the tracking error signal STE2 has converged to some extent, the drive control section 112 swiftly changes the gain values G1 and G2 to 0 and 1 respectively, thereby switching to the information focus control process that uses the information detection signal U2.

Accordingly, like that of the first embodiment, the optical disc device 110 can finally perform the information focus control process. This makes it possible to precisely place the focal point FM1 of the information optical beam LM1 on the target mark layer YG.

In this case, since the gain values G1 and G2 (the equation (6)) are swiftly changed at the time instant tc (FIG. 13B), the time required to switch to the information focus control process is far shorter than that of the first embodiment.

Except that the gain values G1 and G2 (the equation (6)) are swiftly changed, the optical disc device 110 of the second embodiment can offer the same effects as the optical disc device 10 of the first embodiment does.

Moreover, the optical disc device 110 fine adjusts the position of the movable lens 155 of the relay lens 154 by using the focus error signal SFE2. Therefore, the optical disc device 110 can more precisely place the focal point FM of the information optical beam LM on the target mark layer YG than that of the first embodiment, which controls the position of the movable lens 155 according to the relay lens control table.

According to the above configuration, like the optical disc device 10 of the first embodiment, the optical disc device 110 of the second embodiment first performs the reference focus control process that uses the servo detection signal U1. After the amplitude of the tracking error signal STE2 becomes less than the predetermined threshold, the optical disc device 110 switches to the information focus control process that uses the information detection signal U2. Accordingly, the optical disc device 110 can appropriately perform the information focus control while keeping the focal point FM of the information optical beam LM from deviating from the target mark layer YG. Thus, the focal point FM of the information optical beam LM is precisely positioned on the target mark layer YG.

(3) Other Embodiments

In the above-noted embodiments, the optical disc device 10 gradually changes the gain values G1 and G2 (the equation (6)), while the optical disc device 110 swiftly changes the gain values G1 and G2. However, the present invention is not limited to this. For example, the optical disc device 10 may swiftly change the gain values G1 and G2, while the optical disc device 110 may gradually change the gain values G1 and G2.

Moreover, as for the process of changing the gain values G1 and G2, the combination of the first and second embodiments' methods may be applied: for example, the gain values G1 and G2 may be swiftly changed if the amplitude of the tracking error signal STE is less than the predetermined threshold, while they are gradually changed if the amplitude is greater than or equal to the threshold.

Moreover, in the above-noted embodiment, when the gain values G1 and G2 are gradually changed, the time te (FIG. 13A) required to change them may be determined arbitrarily. Furthermore, in the above-noted embodiments, the gain values G1 and G2 are changed with time: as shown in FIG. 13A, a boundary between the areas of the gain G1 and G2 is linear. However, this boundary can be a curving line. In any case, they should satisfy the above-described equations (7).

Furthermore, in the above-noted first embodiment, the hologram is recorded on the recording layer of the optical disc 100 as the recording mark RM; in the second embodiment, a cavity is formed as the recording mark RM. However the present invention is not limited to this. Other recording methods can be applied. For example, an optical disc on which holograms have been formed by an initialization process can be used. In this case, information is recorded by destroying the holograms on the optical disc.

Furthermore, in the above-noted embodiments, only the tracking control process that uses the tracking error signal STE2 is performed. However, the present invention is not limited to this. This process may be performed along with other types of tracking control process.

For example, before performing the tracking control process that uses the tracking error signal STE2, the optical disc device 10 may perform another "rough" tracking control process in which the servo optical beam LS is focused on a desired address based on the address information read out from the reproduction RF signal SRF.

Furthermore, in the above-noted embodiments, after the amplitude of the tracking error signal STE2 becomes less than the predetermined threshold, the device switches from the reference focus control process to the information focus control process. However, the present invention is not limited to this.

For example, after the amplitude of the reproduction RF signal produced from the information detection signal U2 becomes less than the predetermined threshold, the optical disc device 10 may switch to the information focus control. Other switching methods can also be applied.

Furthermore, in the above-noted second embodiment, the position of the movable lens 155 of the relay lens 154 is controlled according to the focus error signal SFE2. However, the present invention is not limited to this.

For example, in the second embodiment, the control section 11 may control the position of the movable lens 155 only using the relay lens control table; in the first embodiment, the control section controls the position of the movable lens 62 according to the focus error signal SFE2.

Furthermore, in the above-noted first embodiment, the optical path formation section 90 includes the laser diodes 31 and 51 of the optical pickup 17, the collimator lenses 32 and 52, the relay lens 61 and the like. However, the present invention is not limited to this. The optical path formation section 90 may have a different configuration, as long as it can cause the optical axes of the servo optical beam LS and the information optical beam LM1 to align with each other, and as long as the distance between the focal points LS and FM is d by making their focusing states (including their divergence angles) different from each other. The same holds for the second embodiment.

Furthermore, in the above-noted first embodiment, the relay lens 61 of the optical pickup 17 adjusts the distance between the focal point LS of the servo optical beam LS and the focal point FM1 of the information optical beam LM1. However, the present invention is not limited to this. Other optical elements may be used. In this case, the focal point FM1 of the beam focused by the objective lens 21 may be moved as the optical path formation section 90 of the optical pickup 17 changes the divergence angle of the information optical beam LM1. The same holds for the second embodiment.

Furthermore, in the first embodiment, the optical disc device 10 is designed to be able to perform both the reproduction and the recording processes on the optical disc 100. However, the present invention is not limited to this. For example, the optical disc device 10 may only perform the reproduction of information from the optical disc 100. In this case, the second surface information optical system 70 can be omitted. The same could be said for the optical disc device 110 of the second embodiment.

Furthermore, in the first embodiment, the optical disc device 10 (which is an optical disc device) includes the laser diode 31 (which is a reference beam source), the laser diode 51 (which is an information beam source), the objective lens 21 (which is an objective lens), the beam formation section 90 (which is a beam formation section), the photodetector 43 (which is a reference beam reception section), the photodetector 66 (which is an information reception section), and the signal processing section 13 and the drive control section 12 (which are a focus control section). However, the present invention is not limited to this. The optical disc device may be configured in a different manner, but include the reference beam source, the information beam source, the objective lens, the beam formation section, the reference beam reception section, the information beam reception section and the focus control section.

Furthermore, in the above-noted second embodiment, the optical disc device 110 (which is an optical disc device)

includes the laser diode 131 (which is a reference beam source and an information beam source), the objective lens 118 (which is an objective lens), the beam formation section 170 (which is a beam formation section), the photodetector 143 (which is a reference beam reception section), the photodetector 160 (which is an information reception section), and the signal processing section 113 and the drive control section 112 (which are a focus control section). However, the present invention is not limited to this. The optical disc device may be configured in a different manner, but include the reference beam source, the information beam source, the objective lens, the beam formation section, the reference beam reception section, the information beam reception section and the focus control section.

The above methods can also be applied to an optical disc device that records information, such as video, sound or other computer data, on an optical disc and reproduces the information from the optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc device comprising:
   a reference beam source that emits a reference optical beam to an optical disc's reference layer on which concentric or spiral reference tracks are formed;
   an information beam source that emits an information optical beam in order to reproduce information from a mark layer on which an information track that contains recording marks representing the information is formed such that the information track corresponds to a reference track of the reference layer, wherein the mark layer is positioned inside a recording layer which is a different layer from the reference layer;
   an objective lens that focuses the reference optical beam and the information optical beam;
   a beam formation section that shapes the reference optical beam and the information optical beam which enter the objective lens, so that, in terms of a direction of an optical axis of the information optical beam, a distance between focal points of the reference optical beam and the information optical beam focused by the objective lens becomes equal to a distance between the mark layer containing the information track and the reference layer;
   a reference beam reception section that receives a reference reflection optical beam which is the reference optical beam reflected by the reference layer of the optical disc;
   an information beam reception section that receives an information reflection optical beam which is the information optical beam reflected by the mark layer of the optical disc;
   a focus control section that performs a focus control process in order to move the objective lens close to or away from the optical disc; and
   a tracking control section that calculates a tracking error signal representing a distance from the information track to the focal point of the information optical beam from a result of receiving the information reflection optical beam, and moves the objective lens toward the outermost or innermost point of the optical disc according to the tracking error signal, wherein
   the focus control section first performs a reference focus control process in which the reference optical beam is focused on the reference layer according to a result of receiving the reference reflection optical beam, and then switches from the reference focus control process to an information focus control process in which the information optical beam is focused on the mark layer according to the result of receiving the information reflection optical beam, and
   the focus control section switches from the reference focus control process to the information focus control process after the focus control section detects that an amplitude of the tracking error signal becomes less than a predetermined level and that a information optical focus error signal representing a distance between the focal point of the information optical beam and the mark layer becomes available.

2. The optical disc device according to claim 1, wherein when switching from the reference focus control process to the information focus control process, the focus control section gradually decreases use of the reference focus control process while gradually increasing use of the information focus control process.

3. The optical disc device according to claim 1, wherein the focus control section swiftly switches from the reference focus control process to the information focus control process.

4. The optical disc device according to claim 1, wherein a cavity is formed in the recording layer of the optical disc as a recording mark.

5. The optical disc device according to claim 1, wherein a hologram is formed in the recording layer of the optical disc as a recording mark.

6. The optical disc device according to claim 1, wherein the beam formation section includes a focal point distance adjustment section that controls a distance between the focal point of the reference optical beam and the focal point of the information optical beam by changing a divergence state of the information optical beam; and
   the focus control section controls the focal point distance adjustment section according to the result of receiving the information reflection optical beam to focus the information optical beam on the mark layer after performing the reference focus control process.

7. The optical disc device according to claim 6, wherein the focal point distance adjustment section includes a movable lens that can move at least in a direction of an optical axis of the information optical beam, and moves the movable lens to adjust a distance between the focal point of the reference optical beam and the focal point of the information optical beam.

8. A focus control method comprising:
   emitting a reference optical beam to an optical disc's reference layer on which concentric or spiral reference tracks are formed, and an information optical beam to a mark layer on which an information track that contains recording marks representing information is formed such that the information track corresponds to a reference track of the reference layer, wherein the mark layer is positioned inside a recording layer which is a different layer from the reference layer;
   receiving a reference reflection optical beam which is the reference optical beam focused by an objective lens and reflected by the reference layer, and performing, according to a result of receiving the reference reflection optical beam, a reference focus control process in order to move the objective lens close to or away from the optical disc;
   shaping the reference optical beam and the information optical beam which enter the objective lens, so that, in terms of a direction of an optical axis of the information optical beam, a distance between focal points of the reference optical beam and information optical beam focused by the objective lens becomes equal to a distance between a target mark layer containing an information track to be targeted and the reference layer;

receiving an information reflection optical beam which is the information optical beam focused by the objective lens and reflected by the target mark layer, and performing an information focus control process according to a result of receiving the information reflection optical beam;

calculating a tracking error signal representing a distance from the information track to the focal point of the information optical beam from the result of receiving the information reflection optical beam, and moving the objective lens toward the outermost or innermost point of the optical disc according to the tracking error signal; and switching from the reference focus control process to the information focus control process after detecting that an amplitude of the tracking error signal becomes less than a predetermined level and that the information optical focus error signal representing a distance between the focal point of the information optical beam and the mark layer becomes available.

* * * * *